July 25, 1961  G. H. LEONARD ET AL  2,993,433
RECORD PROCESSING MACHINE
Filed June 27, 1957  12 Sheets-Sheet 1
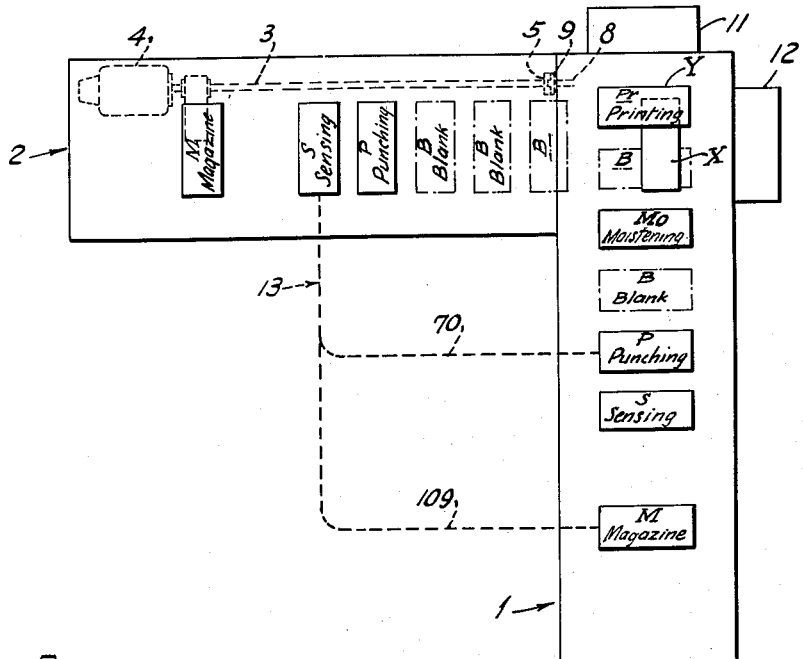
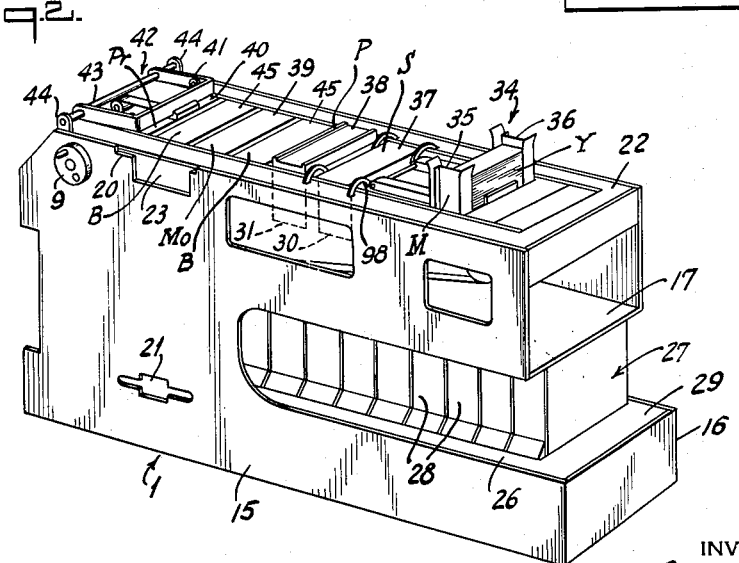
INVENTORS
George H. Leonard
William F. Huck
BY
Curtis, Morris & Safford
ATTORNEYS

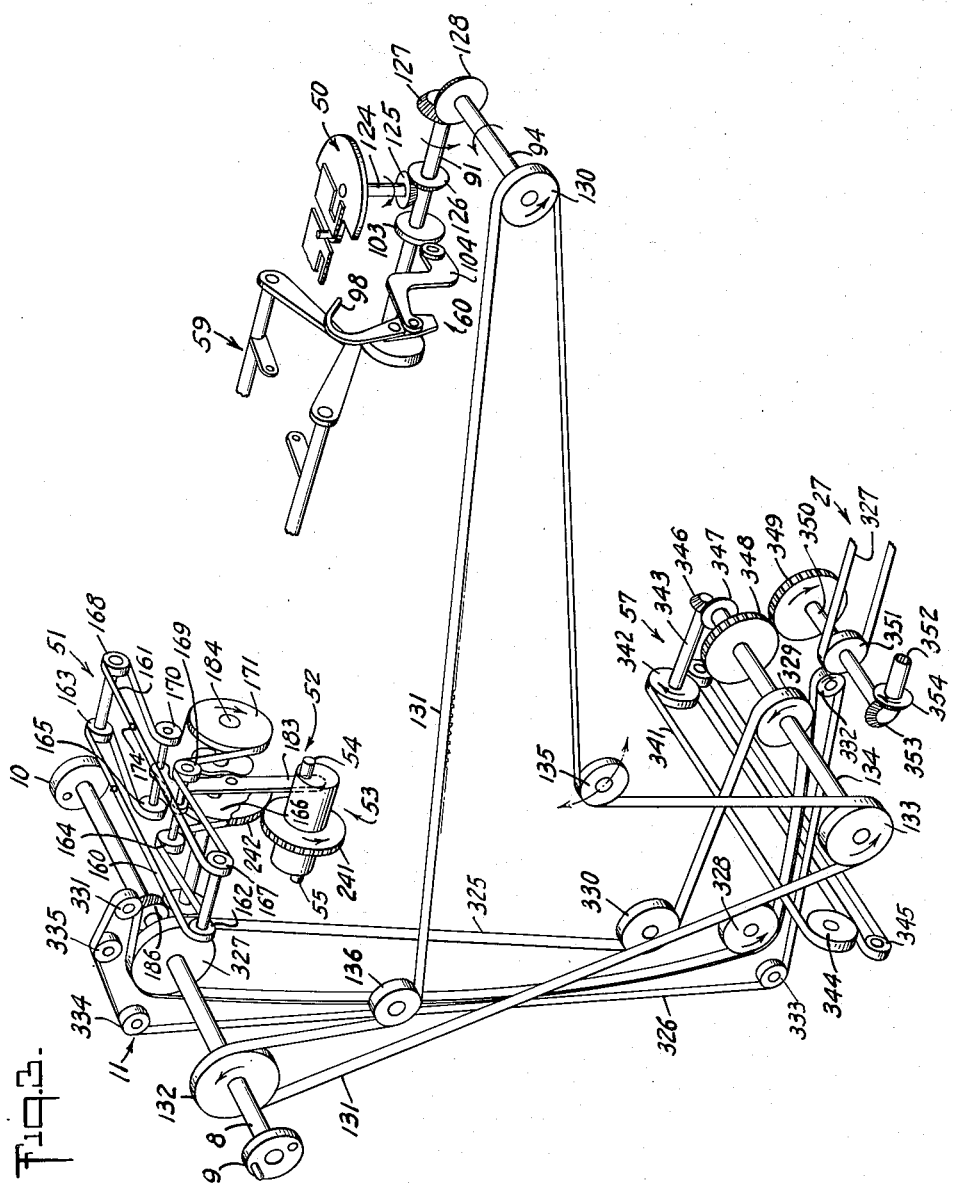

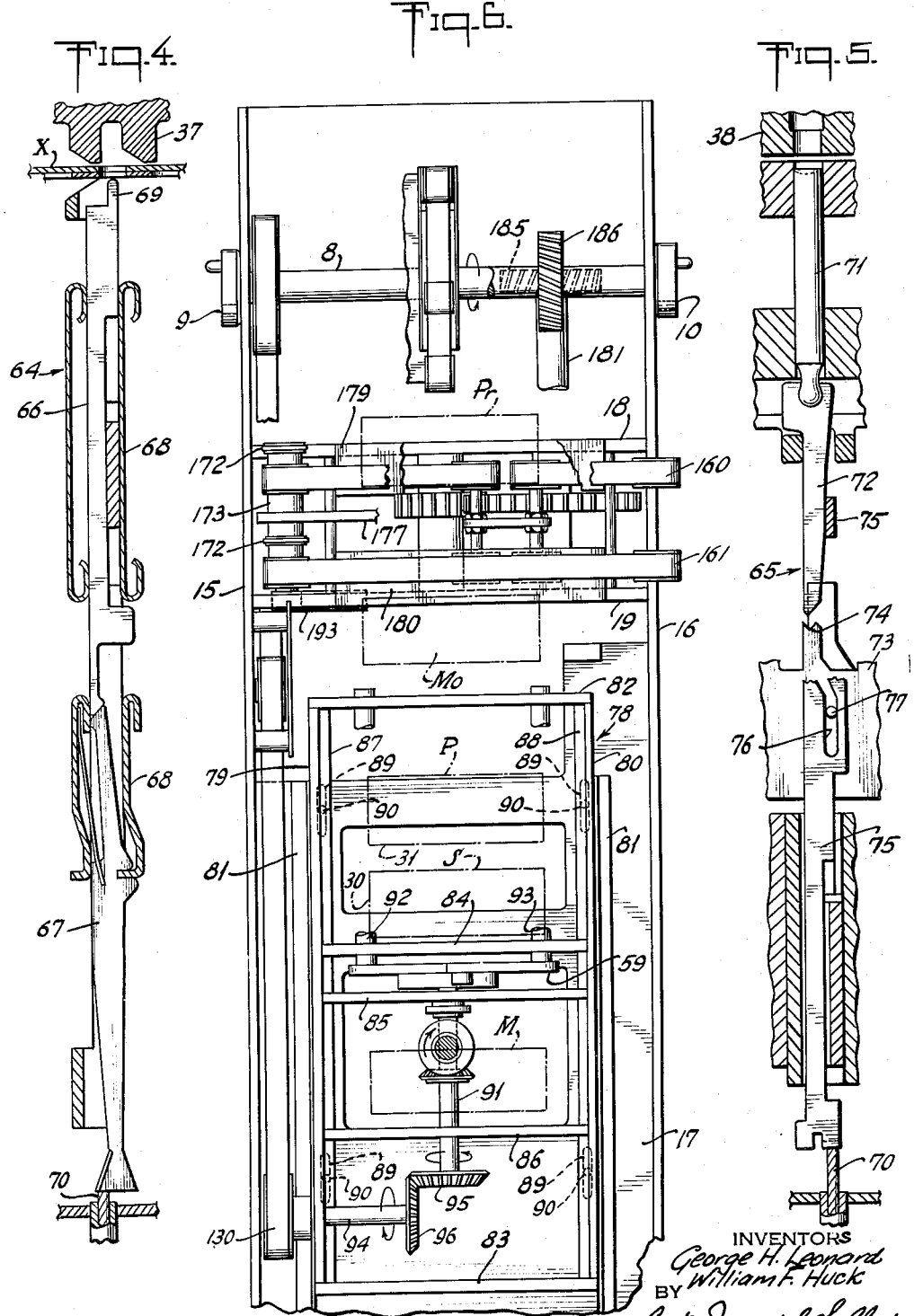

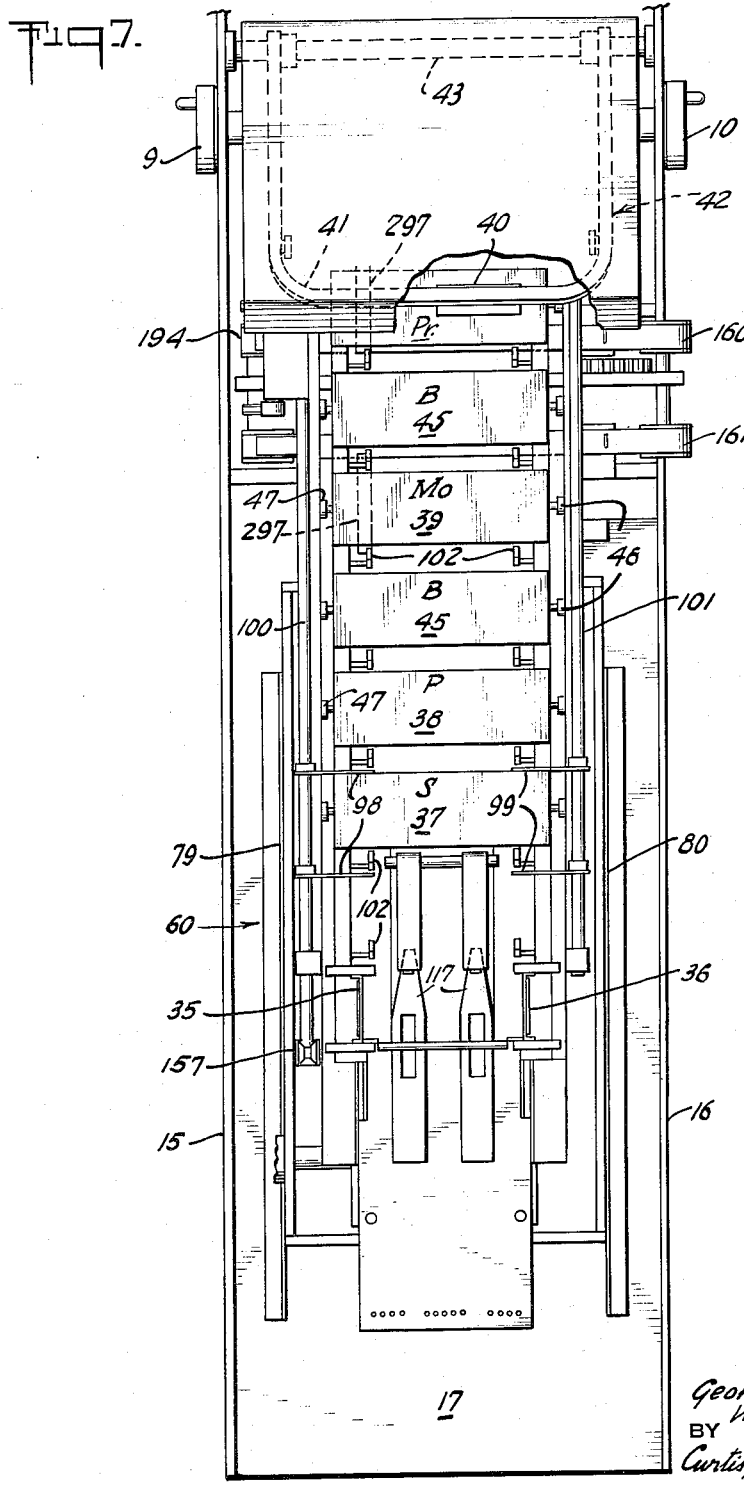

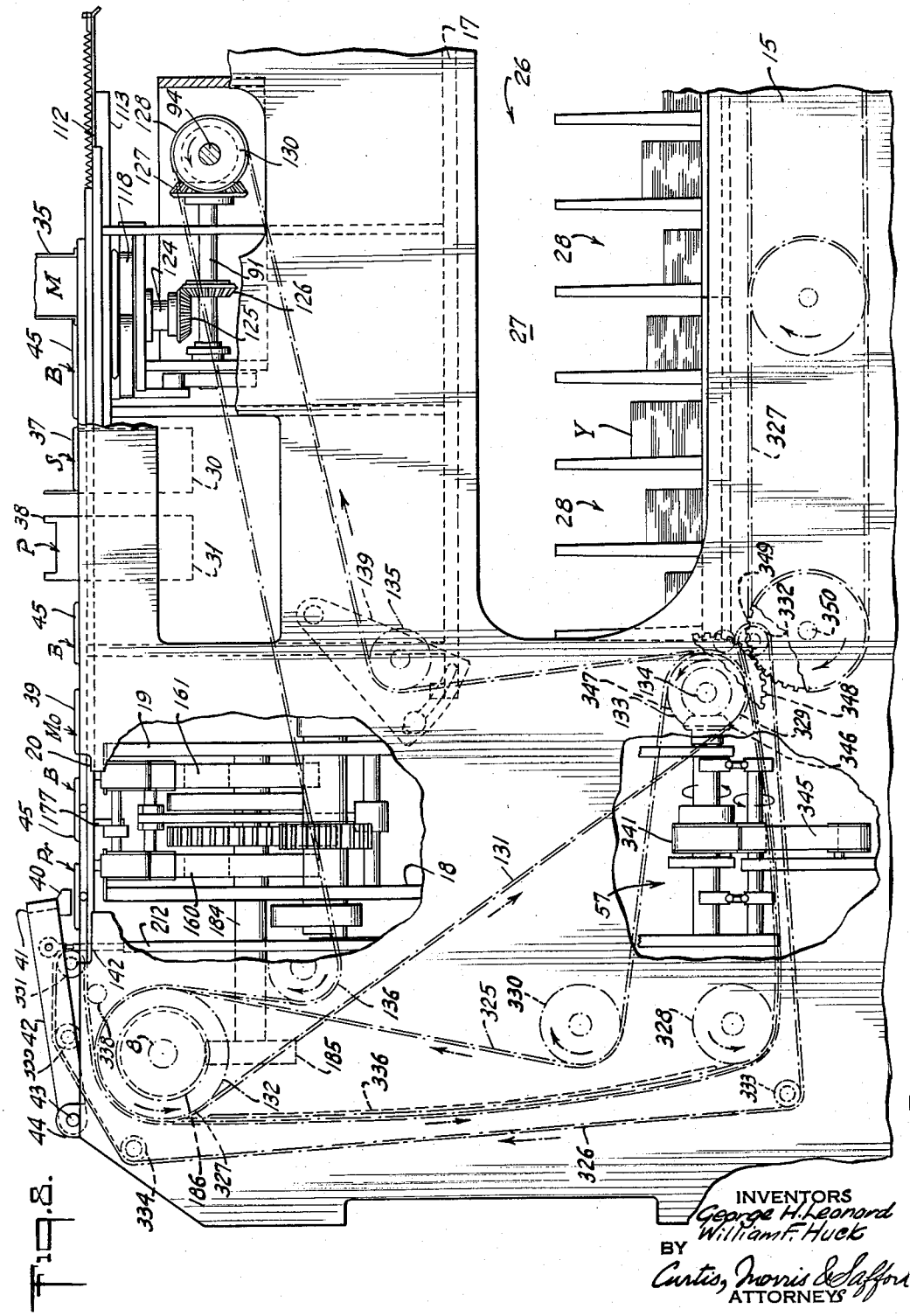

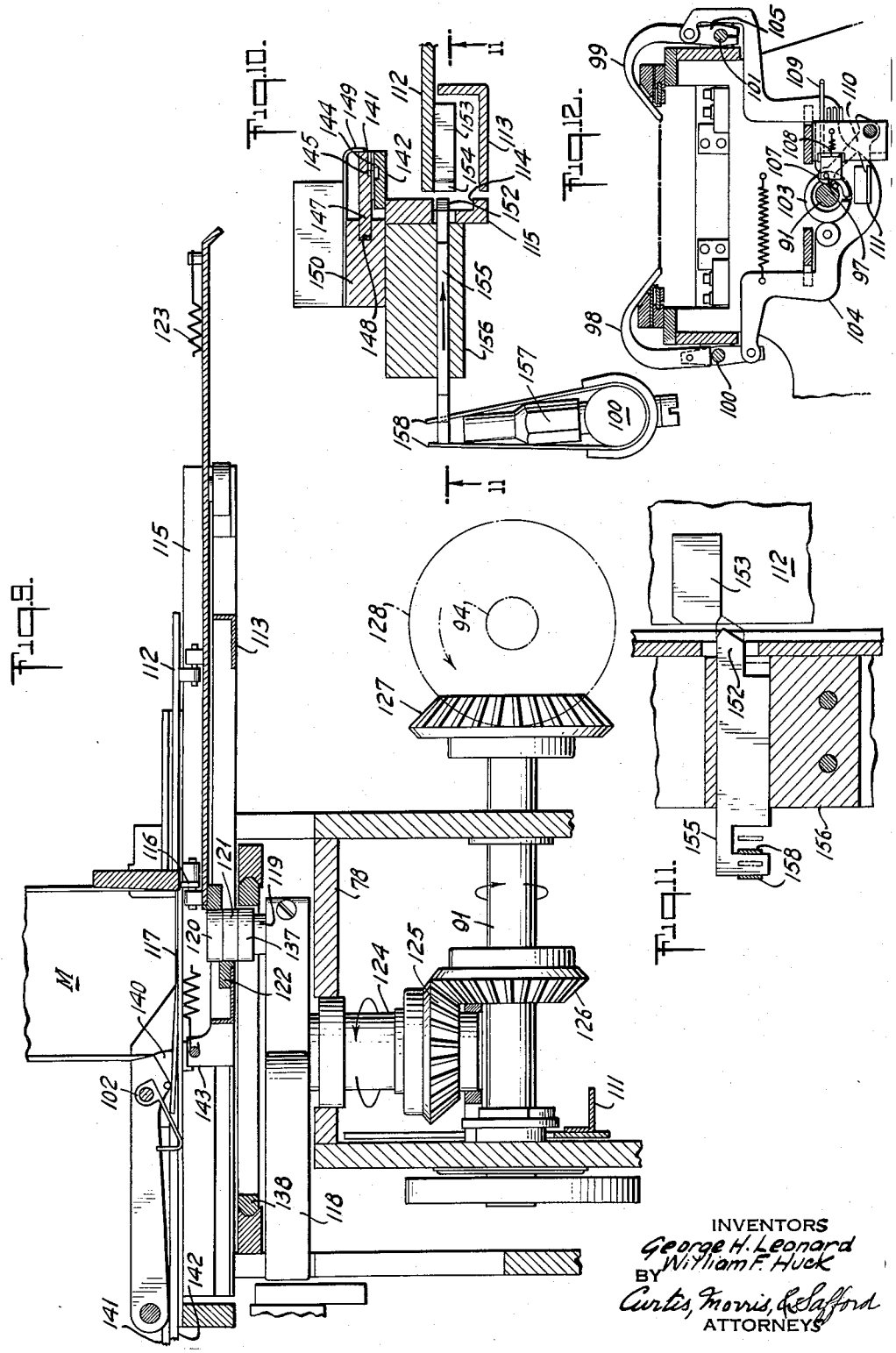

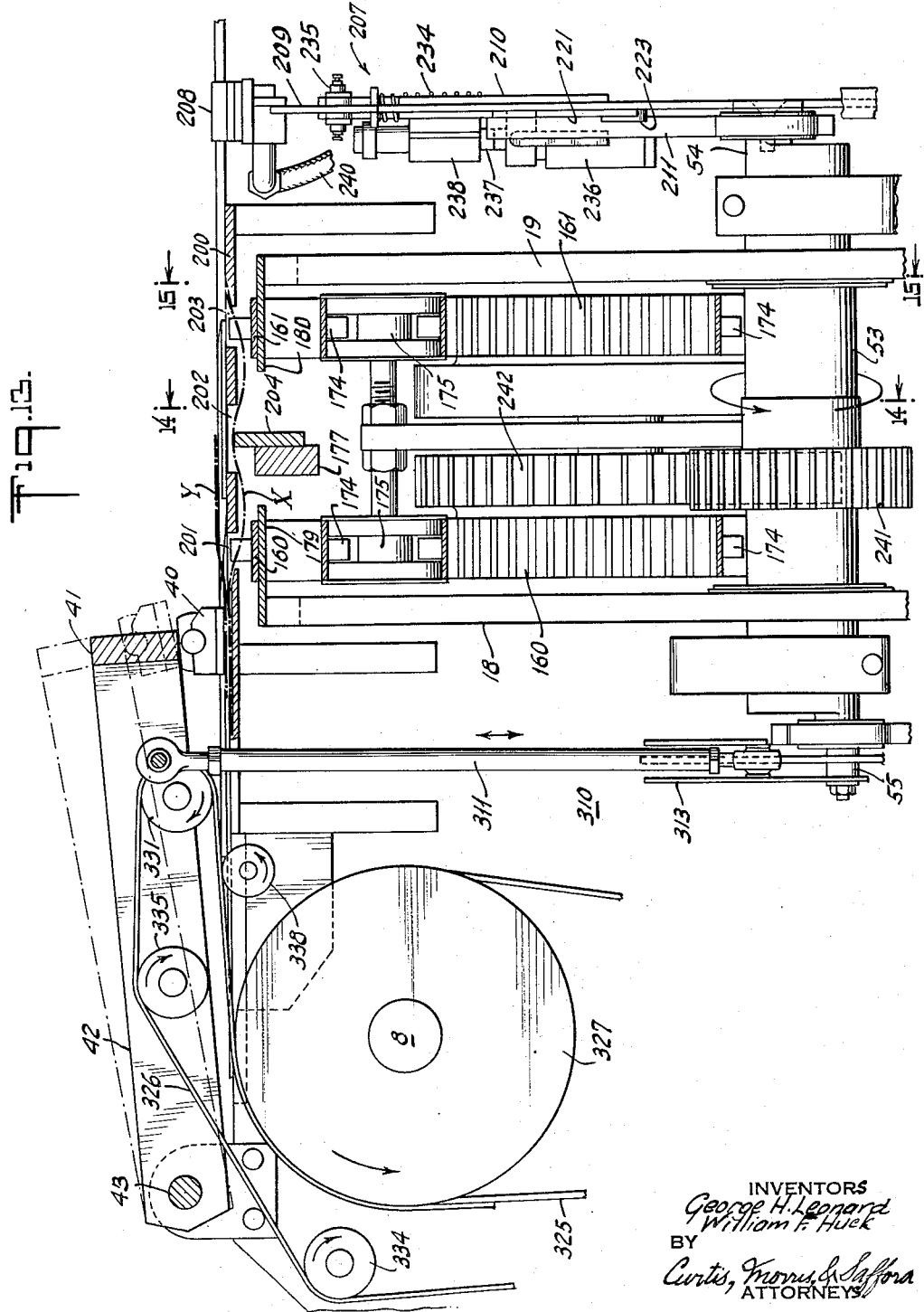

July 25, 1961  G. H. LEONARD ET AL  2,993,433
RECORD PROCESSING MACHINE
Filed June 27, 1957  12 Sheets-Sheet 8
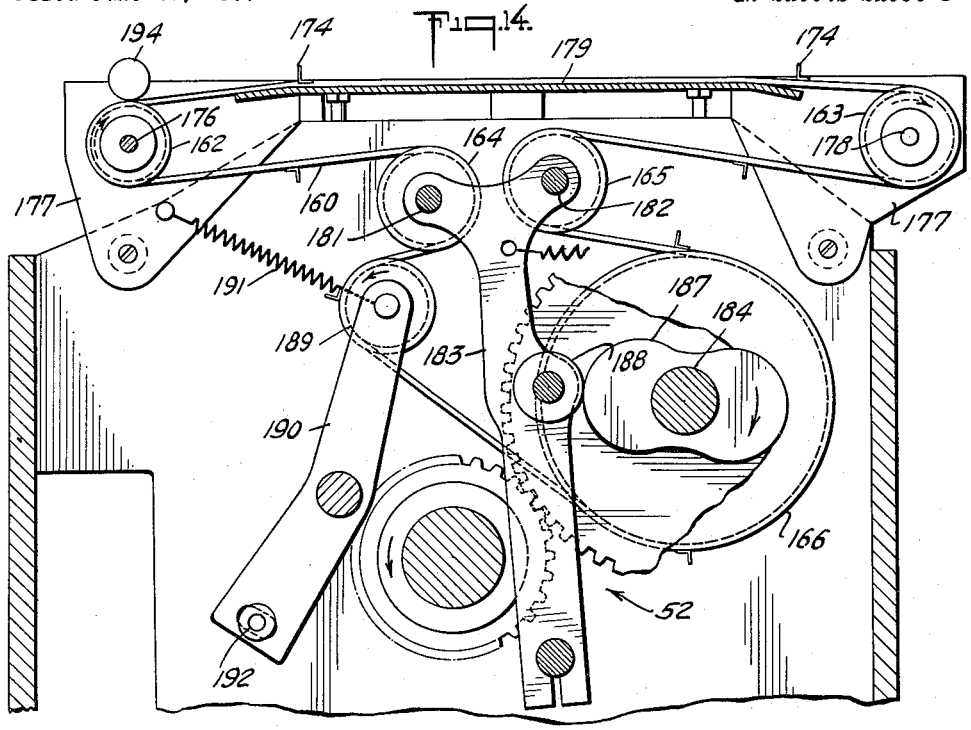
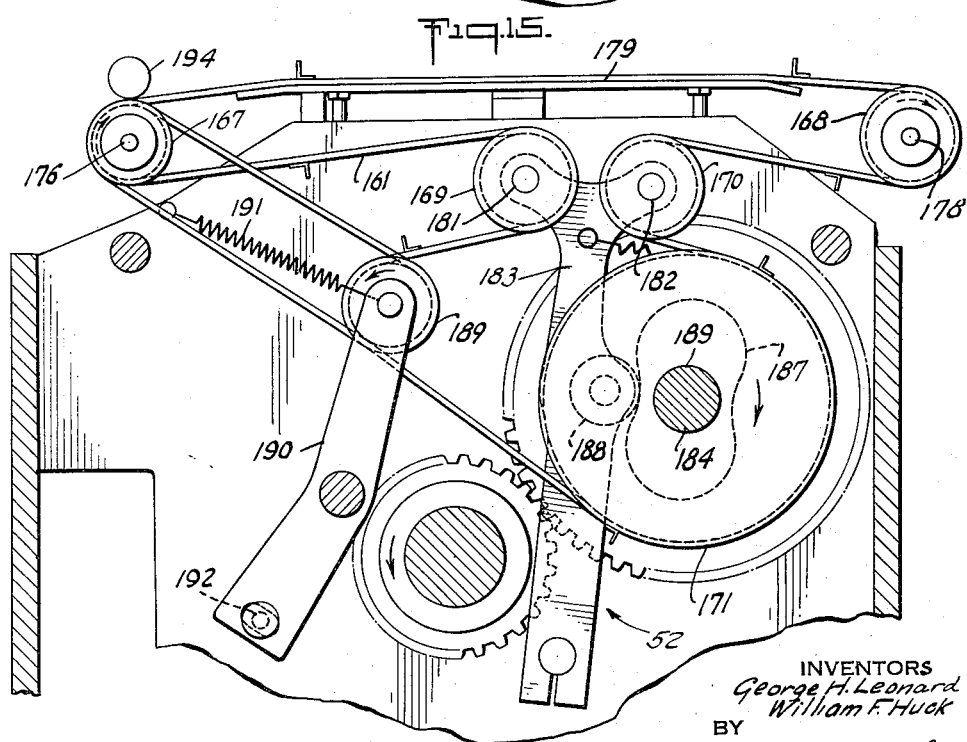
INVENTORS
George H. Leonard
William F. Huck
BY
Curtis, Morris & Safford
ATTORNEYS

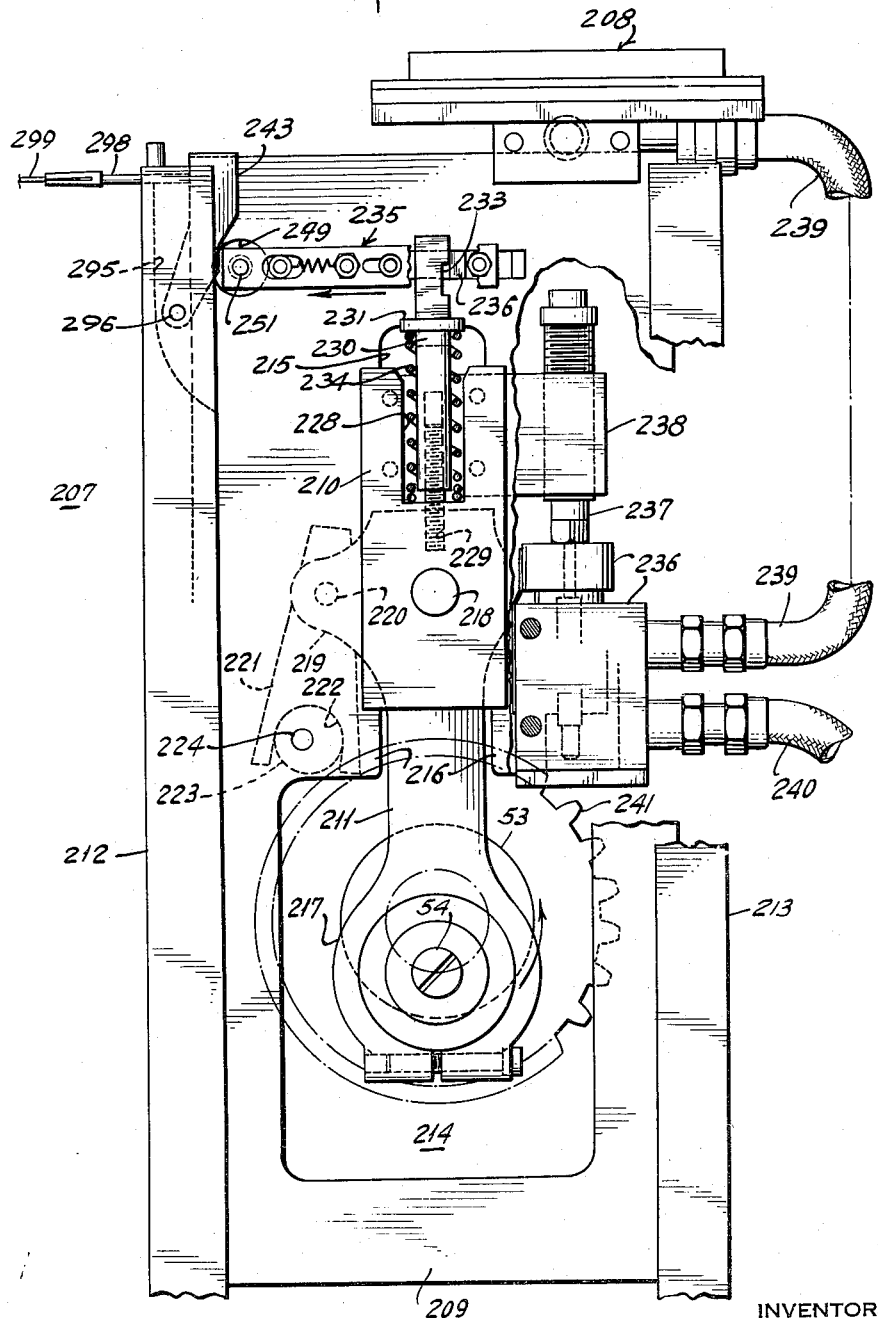

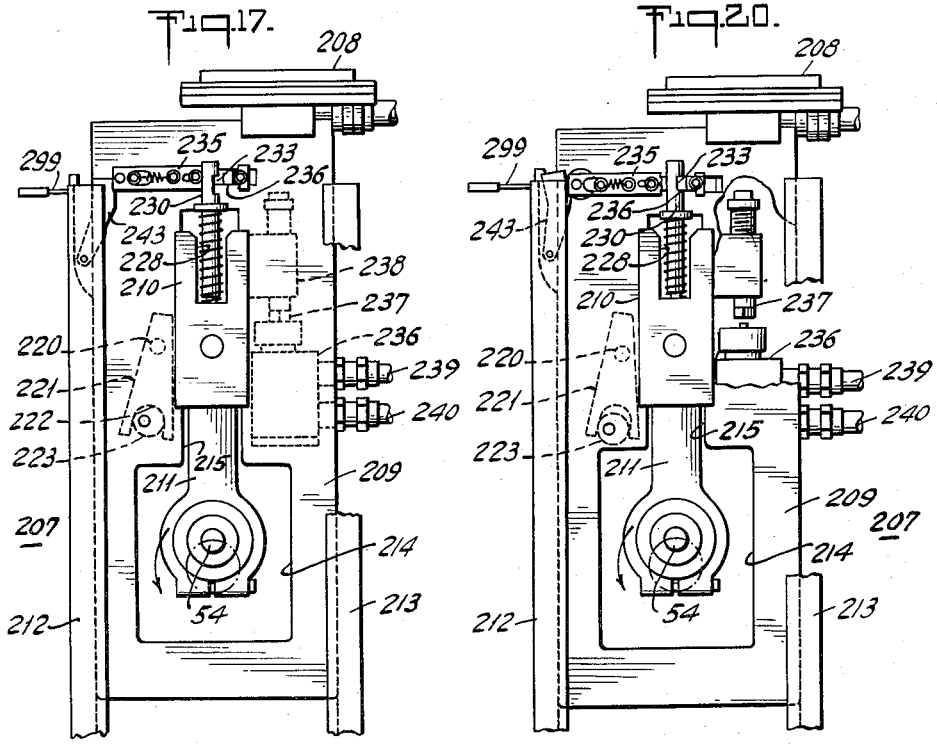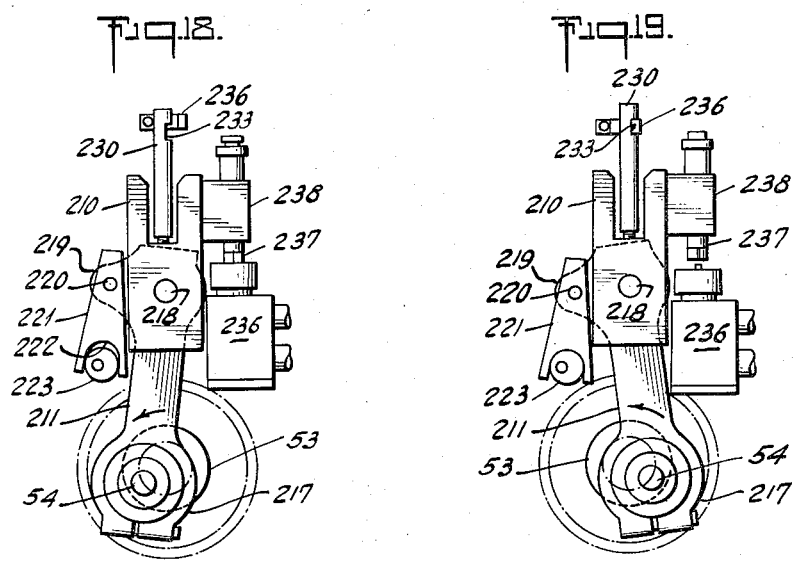

July 25, 1961 G. H. LEONARD ET AL 2,993,433
RECORD PROCESSING MACHINE
Filed June 27, 1957 12 Sheets-Sheet 11
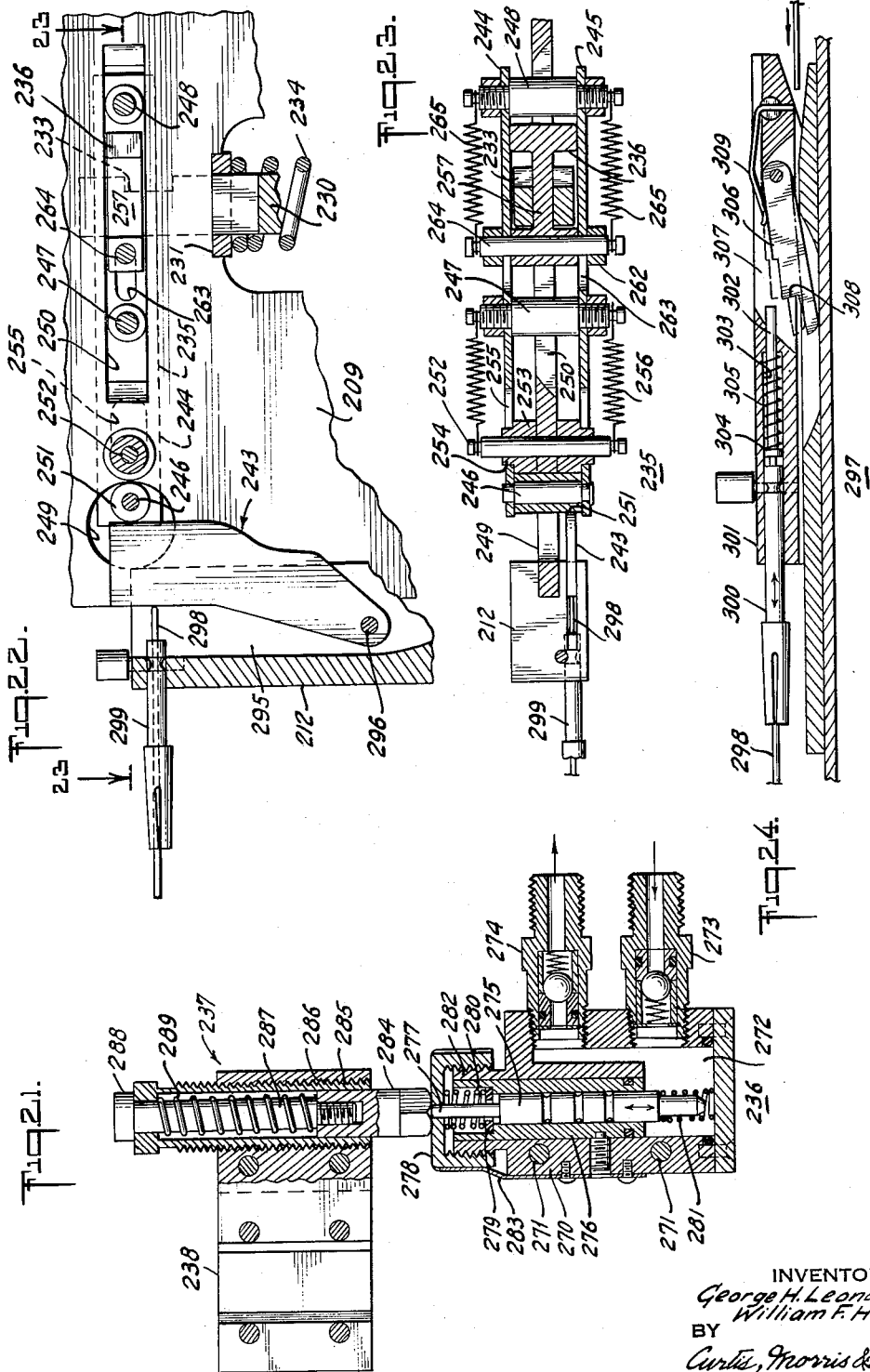
INVENTORS
George H. Leonard
William F. Huck
BY
Curtis, Morris & Safford
ATTORNEYS

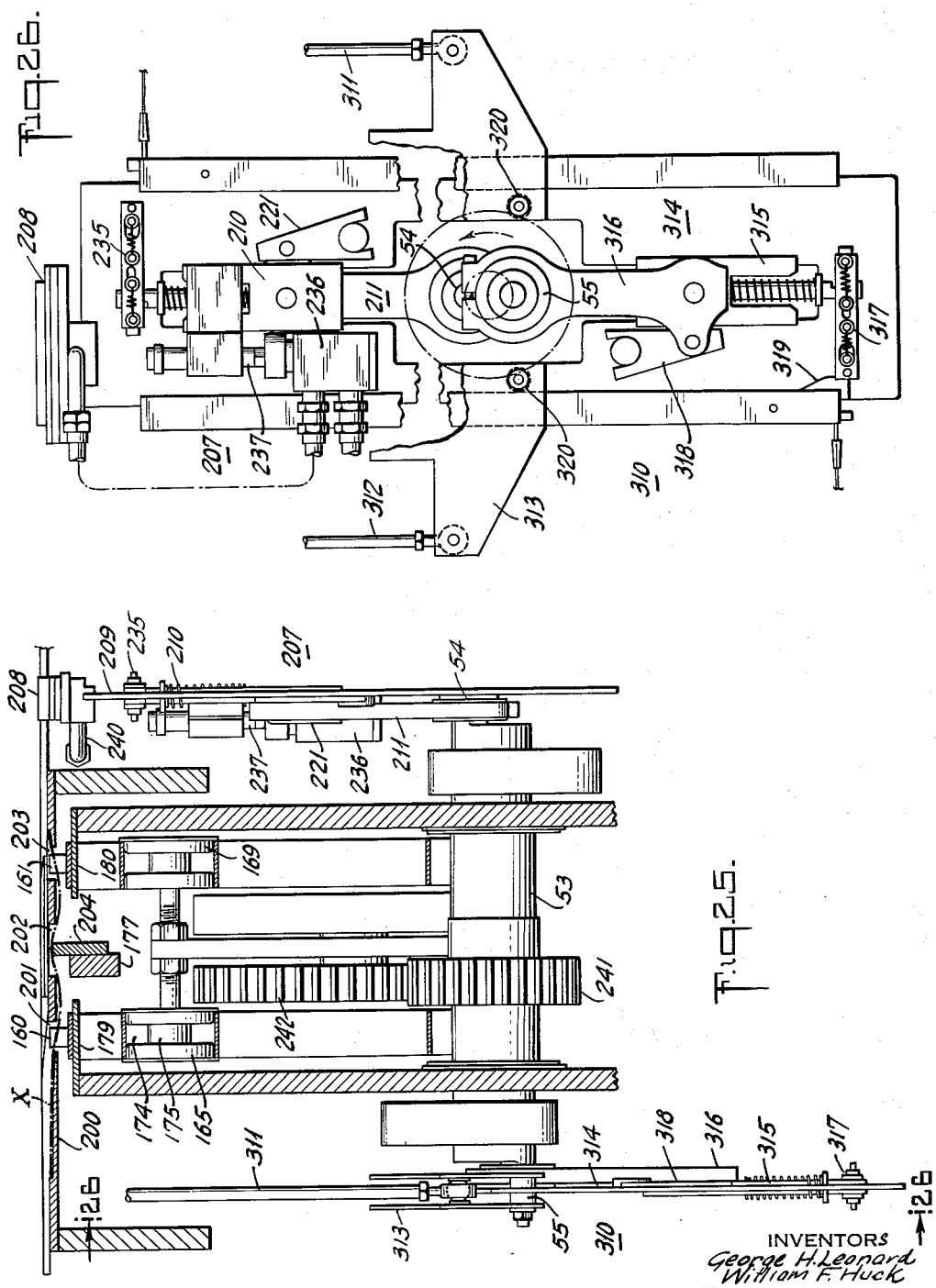

2,993,433
RECORD PROCESSING MACHINE
George H. Leonard, Darien, Conn., and William F.
Huck, Forest Hills, N.Y., assignors, by mesne assignments, to said William F. Huck, doing business as
Huck Company, New York, N.Y.
Filed June 27, 1957, Ser. No. 668,462
52 Claims. (Cl. 101—19)

The present invention relates to record processing apparatus and constitutes a continuation-in-part of the invention described and claimed in our prior application Serial No. 632,525, filed January 4, 1957, entitled "Record Processing Machine."

The basic record processing machine illustrated and described in said prior application has a magazine where a stack of cards are placed. Card feeding mechanism feeds cards from the stack and intermittently advances each card through a plurality of successive stations in the machine at speeds of the order of 130 to 390 cards per minute. The machine has processing assemblies at certain of the stations such as sensing and punching mechanisms which sense information on the record cards and add information thereto. After passage through the machine, the record cards are fed to a sorter and stacker. The machine also includes a counting mechanism for recording the accumulation of different bits of information sensed from the cards. As stated in the prior application, the basic machine also is useful for driving and/or directing the activities of one or more auxiliary card processing machines in response to the information sensed from the cards processed in the basic unit.

The present invention relates to such an auxiliary machine operated in conjunction with the basic unit for transferring at least a portion of the information from primary cards in the basic unit to secondary cards in the auxiliary unit. The auxiliary unit may include all of the components of the basic unit including a magazine, card feeding mechanism including card interrupting or releasing means, sensing and punching mechanisms, a card return unit and a sorter and a stacker. These components of the auxiliary unit are of the same construction and operated in the same way as the components of the basic unit. Therefore, the disclosure of the original application, Serial No. 632,525, may be considered as incorporated herein for its detailed description of the parts and mode of operation of the common components of the two machines.

In addition to the components of the basic machine the auxiliary machine has a printer for transferring information on primary cards to the secondary cards, or vice versa or to dick strips or the like. The secondary cards may be used as bills to be sent to the customer or as advertising sheets or as questionnaires and may have other information punched thereon. Such punched cards, when returned from a customer may be used to transfer its information to its corresponding primary card or to a memory storage device or statistical computer or to all of these elements. The auxiliary machine has a number of unique features for feeding primary and secondary cards in synchronism and transferring information and indicia from each primary card to a corresponding secondary card.

One of the objects of the present invention is to provide an auxiliary machine of the type indicated which may be detachably coupled to the driving means of the basic machine to operate in synchronism therewith.

Another object is to provide an arrangement of basic and auxiliary machines in which the feeding of a secondary card in the auxiliary machine is controlled by information sensed on a primary card in the basic machine.

Another object is to provide a card processing machine of the type indicated for feeding primary and secondary cards to a printing station where indicia is transferred from one card to another by a hectograph process.

Another object is to provide a card processing machine of the type indicated in which primary and secondary cards are advanced intermittently through separate intercepting paths.

Another object is to provide a card processing machine of the type indicated in which the primary and secondary cards are intermittently advanced with a step by step motion by a unique driving mechanism.

Another object is to provide a card processing machine of the type indicated in which cards in one path are moistened with a solvent for the ink of indicia printed on cards in the other path to transfer the indicia from one set of cards to the other.

Another object is to provide a card processing machine of the type indicated in which card moistening and card printing mechanisms are operated in timed relation to the card feeding means by a common drive.

Another object is to provide a card processing machine in which the movement of a card into position at a moistening or printing station controls operation of the card moistening and card printing mechanisms.

Another object is to provide a card processing machine in which the card moistening or card printing mechanisms are operated through a full stroke or a less than a full stroke depending upon whether or not a card to be operated on by said mechanisms is located at its card moistening or printing station.

Another object is to provide a card processing machine in which the primary and secondary cards move in separate paths which cross each other at the top of the machine where the cards are processed and at the bottom of the machine to return the cards to their respective sorters and stackers.

Still another object is to provide a card processing machine of the type indicated which is of a relatively simple and compact construction, reliable in operation and adapted for economical manufacture.

These and other objects will become more apparent from the following descriptions and drawings in which like reference characters denote like parts throughout the several views. It is to be expressly understood, however, that the drawings are for the purpose of illustration only and are not a definition of the limits of the invention, reference being had for this purpose to the appended claims.

In the drawings:
FIGURE 1 is a plan view of a card processing unit incorporating the novel features of the present invention and shown coupled to a basic unit for synchronous operation in conjunction therewith;
FIGURE 2 is a perspective view of the auxiliary card processing unit;
FIGURE 3 is a diagrammatic perspective view of the primary and secondary card feeding mechanism of the card processing unit and their driving means.
FIGURE 4 is an elevational view of one of a plurality of sensing elements at the sensor station for detecting information on a card;
FIGURE 5 is a side elevational view of one of a plurality of punch elements for punching information into a card;
FIGURE 6 is a plan view of the frame of the unit and showing the crossover card feeding mechanism and part of the driving means;
FIGURE 7 is a plan view of the complete unit and showing the secondary card feeding means and the plurality of card stations in the unit;
FIGURE 8 is a side elevational view of the unit partly in section to show the primary and secondary card feeding mechanisms and drive therefor;

FIGURE 9 is a longitudinal sectional view through the secondary card feeding mechanism and showing the relationship of the magazine and card picker.

FIGURE 10 is a transverse sectional view to show the stop mechanism for controlling the initial feeding of secondary cards.

FIGURE 11 is a plan view of the detent of the stopping mechanism for engaging the card feeding carriage.

FIGURE 12 is an end elevational view of the control operable in response to a signal for actuating the stopping mechanism for the card feeding carriage.

FIGURE 13 is a longitudinal sectional view to show the relationship of the moistening and printing station of the unit, the moistening and printing mechanisms in side elevation and single crank shaft for operating the mechanisms in timed relation;

FIGURE 14 is a transverse sectional view taken on line 14—14 of FIGURE 13 to show the oscillating mechanism for transforming continuous rotary motion of a driving element to an intermittent linear movement of a primary card and showing the oscillating arm at one extreme position to the left;

FIGURE 15 is a transverse sectional view taken on line 15—15 of FIGURE 13 to show the other belt of the pair of primary card feed belts and showing the oscillating arm at its other extreme position to the right;

FIGURE 16 is an end elevational view of the moistening mechanism for applying a solvent to the cards and showing the relatively movable plate and crosshead at their lowermost position;

FIGURE 17 is a view similar to FIGURE 16 and showing the relatively movable plate and crosshead in their uppermost position to apply moisture to a card;

FIGURE 18 is a diagrammatic view showing the position of the plate relative to the crosshead when the crank has been rotated 135° counterclockwise from the position shown in FIGURE 17;

FIGURE 19 is a view similar to FIGURE 18 showing the plate depressed relative to the crosshead to align the latching element on the plate with a keeper slot in the crosshead when the crank is moved 90° from the position shown in FIGURE 18.

FIGURE 20 is a view similar to FIGURE 17 showing the plate latched to the crosshead to move the moistening head on the plate through less than a full stroke;

FIGURE 21 is a sectional side elevation view of the fluid pump and its actuating mechanism which are mounted on the relatively movable plate and crosshead, respectively;

FIGURE 22 is a detail view of the cam for controlling the engagement of the latching element on the plate with the keeper on the crosshead;

FIGURE 23 is a sectional plan view of the latch and showing the manner of mounting it on the plate;

FIGURE 24 is a longitudinal sectional view of the card detector for positioning the latch control cam;

FIGURE 25 is a view similar to FIGURE 16 showing the operating mechanism for the printer like that used for the moistening head but in inverted relation thereto;

FIGURE 26 is an end elevational view as viewed from line 26—26 of FIGURE 25 to show the operating mechanism for the printer.

Introduction

As stated above, the present invention relates to a card processing unit for receiving information in the form of signals and transferring the information onto a card. The card processing unit is used in combination with one or a plurality of other units and is driven from a master or basic unit in synchronism.

Primary cards having information thereon are advanced intermittently through successive stations of the master or basic unit while secondary cards are advanced intermittently through successive stations of the auxiliary unit. The basic and auxiliary units are so arranged that the primary and secondary cards move in separate intercepting paths. Information on the primary cards is sensed in the basic unit and at least certain of the information on the primary cards is transferred to corresponding secondary cards. When corresponding primary and secondary cards overlie each other in their separate intercepting paths, indicia is transferred from the primary card to the secondary card or vice versa by a hectograph transfer. The primary cards are then returned to a sorter and stacker in the basic unit and the secondary cards are returned to a sorter and stacker in the auxiliary unit.

The information on the primary cards is in the form of holes punched therein at predetermined locations and the indicia to be transferred is in the form of a soluble carbon ink printed on the upper side of the cards. The primary cards are advanced by a feeding mechanism to a sensing station in the basic unit where the information punched therein is sensed by sensing elements for each hole which, in turn, produce signals. The sensing mechanism may be of any known type, such as an electrical contact, light, magnetism or the like. In the illustrated embodiment each sensing element operates a Bowden wire which transmits motion through the wire to an operating mechanism. The signals transmitted from the sensing station may preset individual punches at a subsequent punching station to punch additional information into the primary cards and at least certain of the signals are transmitted to the auxiliary unit of the present invention.

Secondary cards in the auxiliary unit are advanced by a feeding mechanism, including a card releasing or card intercepting mechanism, as controlled by a signal from the sensing station of the basic unit. Also, the transfer of information from the primary card to a secondary card is controlled by signals from the sensing station in the basic unit to preset corresponding punches at the punching station in the auxiliary unit. As the two units operate in unison, the information sensed at particular locations on the primary card is punched either at the same or a different location on the corresponding secondary card. The corresponding primary and secondary cards are then intermittently advanced in their separate paths through the same number of other blank or processing stations until they overlie each other.

The auxiliary unit has a moistening station where an area of the bottom of the secondary card is moistened with a solvent for the carbon ink on the primary card. Beyond the moistening station of the auxiliary unit is a printing station where the primary and secondary cards overlie each other and are pressed together. The liquid solvent on the secondary card then dissolves a portion of the carbon ink on the primary card to transfer the indicia from the primary card to the secondary card.

The auxiliary unit has in addition to the card feeding means for feeding secondary cards through successive stations longitudinally of the unit, a crossover card feeding mechanism for feeding primary cards transversely of the machine. The two separate card feeding means of the auxiliary unit are both positively driven from the same drive shaft so that the corresponding primary and secondary cards are brought to their proper location overlying each other at the printing station. The indicia may be printed at any location on the primary card to transfer it to any desired location on the secondary card. To this end, the initial location of the primary and secondary cards relative to the printing station may be adjusted by adjusting the feeding mechanisms for the primary and secondary cards relative to the printing station.

For the purpose of understanding the relationship of the basic unit and auxiliary unit before considering the detailed description, let it be assumed that the primary card contains the information of a customer's status and that the secondary card may be in the form of a bill to be sent to the customer when a subscription is about to expire or to advertise a new product or contains some other notice or information on which an answer is expected. The information to be duplicated from the primary card may include any conceivable information such as a date, amount due, geographical location or the like, and printed indicia such as the customer's name and address. Operation of the auxiliary unit to feed a secondary card may be controlled by a date punched in the primary card and sensed at the sensing station in the basic unit. The sensed date in the basic unit produces a signal which is transmitted to the auxiliary unit to operate the secondary card feeding mechanism.

In addition, the information to be transferred from the primary card to the secondary card is also sensed in the basic unit and transmitted as signals to preset corresponding punches in the auxiliary unit. During the next stroke of the operating mechanism of both the primary and secondary units in unison, the information will be punched in the secondary card. When the secondary cards are returned from the customer they may be fed through the auxiliary unit or another auxiliary unit where the information contained in the secondary card is sensed and used to match the secondary card with its corresponding primary card in the basic unit; and cause the information on the secondary card to be punched into the primary card. It is to be understood, however, that the above specific example is only for the purpose of describing one relationship of the basic and auxiliary units and should not be construed as limiting the many various applications of the auxiliary unit.

Relationship of basic and auxiliary units

The auxiliary and basic card processing units 1 and 2 may have a greater or lesser number of processing stations for particular applications. As illustrated in FIGURE 1, both the auxiliary unit 1 and the basic unit 2 have a magazine station M, sensing station S, punching station P and a plurality of blank stations B. The auxiliary unit 1 has in addition to these stations a moistening station Mo and a printing station Pr with a blank station B therebetween.

It is to be understood that the blank stations B in the auxiliary and basic units 1 and 2 may have additional processing mechanisms such as sensing and punching mechanisms. For example, the blank stations B beyond the punching station P in the basic unit 2 may have a punching mechanism for punching information into primary cards which is sensed by the sensing mechanism in the auxiliary unit or other unit; and a sensing station to verify the information punched in the primary card. The blank stations B in the auxiliary unit 1 also may have additional punching and sensing stations for punching additional information on the secondary cards sensed from other units than the basic unit; and to sense information for verification or to compare it with information on a primary card or for supplying information to a memory device or for any other purpose in a particular application. Furthermore, the location of the sensing and punching stations S and P may be rearranged in the auxiliary and basic units 1 and 2. Therefore, certain of the stations in both the auxiliary and basic units 1 and 2 are illustrated as blank stations B merely for the purposes of simplifying the description.

For the purpose of describing one embodiment of the invention, an application has been assumed in which information sensed on a primary card X at the sensing station S of the basic unit 2 controls the feeding of a secondary card Y in the auxiliary unit 1; and in which information sensed on primary card X at the sensing station S of the basic unit 2 presets punches at the punching station P of the auxiliary unit 1 to punch the information in a corresponding secondary card Y. It will be noted that there is the same number of processing and blank stations between the punching stations P in the auxiliary and basic units 1 and 2 and the printing station Pr in the auxiliary unit so that corresponding primary and secondary cards X and Y are advanced at the same rate to meet at the printing station.

Auxiliary unit 1 is so arranged with respect to the basic unit 2 that primary cards X from the basic unit 2 and secondary cards Y from the auxiliary unit 1 move in separate intercepting paths. As illustrated in FIGURE 1, the end of the basic unit 2 from which the primary cards X are discharged abuts the side of the auxiliary unit 1 adjacent the end from which the secondary cards Y are discharged. Thus, the primary and secondary cards X and Y move through separate right angular paths.

Basic unit 2 is identical with that described and claimed in our prior application, referred to above, and has a main drive shaft 3 extending longitudinally thereof and driven by an electric motor 4. A detachable coupling element 5 is provided at the end of drive shaft 3 which extends to the end wall of the unit.

Auxiliary unit 1 has a main drive shaft 8 extending transversely thereof with a detachable coupling element 9 extending to its side wall for engagement with the coupling element 5 and the basic unit 2. Thus, the drive shaft 8 of the auxiliary unit 1 is driven from the drive shaft 3 of the basic unit 2 to operate the working elements of the two units in synchronism. Drive shaft 8 also has a detachable coupling element 10 at its opposite end so that another auxiliary unit may be coupled thereto and operated in synchronism with the basic and auxiliary units. Card return conveyors 11 and 12 are provided at the end of the auxiliary unit 1 beyond the printing station Pr and at the side of the auxiliary unit opposite the basic unit 2, respectively.

A control connection 13 is illustrated in Figure 1 which is representative of a number of such connections between the auxiliary and basic units 1 and 2 for controlling the operation mechanisms, one from the other. In the illustrated embodiment, control connection 13 extends between the sensing element S of the basic unit 2 and a secondary card feeding mechanism and punching mechanism of the auxilitary unit 1. Connection 13 is adapted to transmit a signal to control operation of the auxiliary unit and supply information thereto from information on a primary card in the basic unit 2. It will be understood that other connections may be provided between the two units 1 and 2 to provide any other desired operation of the units, one from the other, in synchronism. Basic unit 2 is shown coupled to the auxiliary unit 1, but it will be understood that either unit may be easily and quickly detached from the other unit for independent operation of the basic unit or in other combinations with other auxiliary units. Thus, the provision of a plurality of units adapted to be coupled one with the other provides for flexibility in application to known or desired systems.

Auxiliary unit

The card processing unit 1 is shown in perspective in FIGURE 2 and the construction and arrangement of elements therein is shown in FIGURES 3 to 8. The frame of unit 1 comprises spaced side plates 15 and 16 held in vertical spaced relationship by cross members including a horizontally positioned bed plate 17, see FIGURE 2, and vertically positioned bulkhead plates 18 and 19, see FIGURE 6.

As shown in FIGURE 2, each side plate 15 and 16 has horizontal slots 20 and 21 aligned vertically adjacent the left hand end of the unit as illustrated through which primary cards X are fed thereto and discharged therefrom. Card slot 20 is located at the top of the side plate 15 under a removable marginal cover plate 22 and the slot has a depending recessed portion 23 to provide access to card transfer and feeding pulleys, see FIGURES 8 and 15.

Side plates 15 and 16 of the unit frame also have a window opening 26 extending inwardly from the right hand ends of the plates as viewed in FIGURE 2. These window openings 26 overlie a card sorter and stacker 27 to provide access to the plurality of stacking bins 28 for removal of cards therefrom. The card sorter and stacker 27 is supported on beams underlying a transverse floor plate 29 extending between the side plates 15 and 16 at the bottom of the window opening. Floor plate 29 is open under the stacking bins 28 to adapt secondary cards Y to be sorted and stacked in the particular bin as described and claimed in our prior application.

As illustrated in FIGURE 2, the top of the card processing unit 1 is open at the interior of the marginal cover plate 22 and forms a plurality of processing and blank stations through which the secondary cards Y move successively. As stated above, these stations are the magazine station M where cards Y to be processed are stacked, a blank station B, a sensing station S where a sensing mechanism 30 is located, a punching station P where a punching mechanism 31 is located, a blank station B, a moistening station Mo, a blank station B and a printing station Pr. As stated above, the blank station B between the punching station P and moistening station Mo may have a second sensing mechanism or a second punching station as required for any particular installation. Each of the processing stations M, S, P, Mo and Pr and blank stations B are of a width corresponding to the width of a card Y in their direction of movement and the stations are spaced equal increments of distance from each other. The card feeding mechanism later to be described in detail, is adapted to advance a series of successive cards Y a distance equal to the width of a card plus the spacing between stations so that each card will be moved from one station to the next adjacent station during each stroke of the card feeding mechanism.

A magazine 34 is provided at the magazine station M and is in the form of vertical guide plates 35 and 36 attached to and projecting upwardly from the frame. The guide plates 35 and 36 are spaced a distance equal to the length of the cards Y to be processed and have flanges overlying the sides of the cards to hold them in alignment in a stack.

The cards advance along the top of the unit so that they may be observed by an operator and are processed by the sensing and punching mechanisms 30 and 31 located below the cards. Removable transparent covers overlie each of the processing and blank stations except the printing station Pr. Such a cover 37 overlies the sensor station S to hold cards and provide a reactive force to set the sensing elements when no hole is present and to protect the sensing elements when they project through holes in the card. A cover 38 overlies the punching station P and has holes formed therein in alignment with the individual punches of the punching mechanism 31 to provide a die plate for punching the cards. A cover plate 39 overlies the moistening station Mo to provide a platen against which the moistening mechanism operates to apply solvent to the bottom of the card. A pressing head 40 overlies the open printing station Pr and is mounted on the cross bar 41 of a U-shaped bail 42 having its ends pivotally mounted on a rod 43 extending between upwardly projecting lugs 44 on side plates 15 and 16. Cover plates 45 also overlie the blank stations B to prevent the accumulation of dust. As shown in FIGURE 7, all of the cover plates 37, 38, 39 and 45 are removably attached to the machine by spring pressed detents 46 and 47.

The various operating parts of the machine and their driving means are illustrated diagrammatically in FIGURE 3. These operating parts comprise a card feeding mechanism 50 for feeding secondary cards longitudinally of the machine; a crossover card feeding mechanism 51 for feeding primary cards in a path at right angles to the path of the secondary cards; an oscillating mechanism 52 for transforming continuous rotary motion of a drive shaft to an intermittent linear motion of a primary card feeding mechanism; a crank shaft 53 adjacent the oscillating mechanism having eccentric pins 54 and 55 at its ends for operating the moistening and printing mechanisms; return conveyor 11 for secondary cards; a crossover return conveyor 57 for primary cards which receives the cards from the card return conveyor 12; the sorter and stacker mechanism 27; the work operator 59 for operating the sensing mechanism 30, if a sensing mechanism is used, and punching mechanism 31 for punching the sensed information on secondary cards Y; and a card release mechanism 60. These operating parts of the machine will be described in detail in connection with other views. However, it is to be observed in FIGURE 3 at this time that all of these operating parts are directly connected to and are operated by the drive shaft 8 in their proper timed relation to each other. Shaft 8, in turn, is directly connected to the main drive shaft 3 of the basic unit 2 and the couplings 5 and 9 are so arranged as to drive the card feeding mechanisms 50 and 51 and work operator 59 in exact synchronism with the corresponding card feeding mechanisms and work operator of the basic unit 2 and thereby actuate the sensing and punching mechanisms 30 and 31 of the two units simultaneously in synchronism.

The sensing and punching mechanisms 30 and 31 of auxiliary unit 1 are identical with those described and claimed in our prior application Serial No. 632,525, referred to above. Suffice it to state herein that the sensing mechanism 30 comprises a plurality of feeler elements 64, one of which is illustrated in FIGURE 4, corresponding to the number of locations on a primary card where information is stored in the form of punched holes. These feeler elements 64 are simultaneously reciprocated vertically with respect to a card by the work operator 59. During an upstroke each feeler element 64 projects through a punched hole in the card when such a hole exists at that particular location. The projection of the feeler elements 64 through holes presets the elements during an upstroke so that on a down stroke they will transmit signals to corresponding punch elements 65, one of which is illustrated in FIGURE 5, of the punching mechanism 31. On the other hand, if any feeler element 64 engages the card it presets the element so that no signal is transmitted to its corresponding punch element 65 of the punching mechanism 31.

The punching mechanism 31 also comprises a plurality of punching elements 65 corresponding to the number of locations on a card where information is to be punched. The plurality of punch elements 65 in the auxiliary unit are reciprocated in unison with the reciprocation of the feeler elements 64 in the basic unit and those punch elements that are preset by the feeler elements during one reciprocation of the latter, operate to punch corresponding holes in a secondary card during the next upstroke of the punching mechanism 31.

FIGURES 4 and 5 illustrate a feeler element 64 and punch element 65 identical with those illustrated and described in our prior application. Feeler element 64 comprises relatively movable and aligned upper sensing and lower flipper parts 66 and 67 having inclined abutting ends. When the element 64 is moved upwardly by the reciprocating actuators 68 and the reduced feeler 69 at the upper end of upper part 66 projects through a hole in a primary card X the parts 66 and 67 retain the relationship illustrated in FIGURE 4. During the downward stroke of the feeler element 64 the lower part 67 actuates a Bowden wire 70 to preset a punching element 65 for punching a secondary card Y. On the other hand, if the feeler 69 engages the primary card X and is prevented from further upward movement, the inclined end at the lower end of the upper part 66 slips by the upper inclined end of the lower flipper 67 so that the feeler element 64 does not actuate the Bowden wire 70.

The punching element 65 also includes an upper punch 71, an intermediate rocking flipper 72 having an articulated connection to the lower end of the punch, a lift bar 73 having a notch 74 at its upper edge and a set-up slide 75 having a cam slot 76 cooperating with a pin 77 projecting from the lift bar. The parts of the punch element 65 also are reciprocated by the actuator of the work operator 59 in synchronism with the reciprocating actuator of the sensing mechanism. If a signal has been transmitted through a Bowden wire 70 to punch a particular hole, the set up slide 75 engages the end of the Bowden wire during a down stroke and moves relative to the lift bar 73 to shift the flipper 72 so that it overlies the notch 74 in the lift bar 73. During the next upstroke of the actuating mechanism the punch 71 punches a hole in the card Y.

Referring to FIGURE 6, the moistening mechanism at the moistening station Mo and printing mechanism at the printing station Pr, later to be described, are mounted on the transverse bulkhead plates 18 and 19 so that their position is fixed. The card feeding mechanism 50 including the card release mechanism 60 for feeding secondary cards Y, the sensing mechanism 30, if a sensing mechanism is used, the punching mechanism 31, the work operator 59 for the punching mechanism and the drive means therefor are movable bodily longitudinally of the unit to adjust the position of the secondary cards at the printing station Pr. This adjustment permits secondary cards Y to be printed at any location along its width.

To this end, the sensing mechanism 30 and punching mechanism 31, indicated by the dash lines in FIGURE 6, together with the work operator 59 and drive mechanism therefor are mounted on an open box frame 78 between the side plates 15 and 16 of the main frame. The open box frame 78 has vertical side plates 79 and 80 which rest on the bed plate 17 of the main frame and is guided to slide longitudinally thereon by angle iron guide tracks 81 having flanges projecting upwardly from the bed plate. The box frame 78 has transverse tie plates 82 and 83 at each end and intermediate tie plates 84, 85 and 86 extending between the side plates 79 and 80. Side plates 79 and 80 of box frame 78 have inwardly directed flanges 87 and 88 at their lower ends which overlie slots 89 in the bed plate 17. Thus, the box frame 78 may be slid on the bed plate 17 longitudinally of the unit through a distance at least equal to the width of a secondary card Y and then bolted to the bed plate by bolts 90 projecting through the flanges 87 and bed plate.

As shown in FIGURE 6, a shaft 91 for operating the card feeding mechanism 50 for the secondary cards and work operator 59 is journaled for rotation in the intermediate tie plates 85 and 86. The rock shafts 92 and 93 of the work operator 59 are journaled in the intermediate and end tie plates 84 and 82. A transmission shaft 94 extends at right angles to driving shaft 91 and is journaled in the side plate 79 of the box frame 78 and the two shafts are connected by bevel gears 95 and 96. Thus, the driving means for the card feeding mechanism 50 and work operator 59 are movable with the mechanisms as an integral unit.

As shown in the plan view of the machine in FIGURE 7, the card interrupt mechanism 60 comprises card engaging elements 98 and 99 at opposite sides of the machine and located at each of the stations between the magazine M and printing station P. When additional sensing and punching mechanisms S and P are used additional release elements 98 and 99 would be provided at these stations. The card engaging elements 98 and 99 are in the form of curved arms mounted on a pair of rock shafts 100 and 101, respectively. Shafts 100 and 101, in turn, are journaled in bearings on the side plates 79 and 80 on the box frame 78 mounting the punching mechanism 31. When the rock shafts 100 and 101 are rocked inwardly towards each other the arms 98 and 99 are located in front of the cards Y at all of the stations between the card feeding mechanism 50 and the punching station P.

When a series of secondary cards Y are interrupted by the arms 98 and 99 the card feeding mechanism 50 slips and moves relative to the cards. The cards Y are held from return movement with the card feeding mechanism 50 by means of detents 102, see FIGURE 9, which hold the cards in their advanced position. However, when the rock shafts 100 and 101 are rocked outwardly, the card engaging arms 98 and 99 are moved out of the path of the cards Y to permit them to advance.

In the illustrated embodiment, rock shafts 100 and 101 are normally positioned to hold the secondary cards Y from advancing but are rocked to a raised card releasing position during a card advancing stroke of card feeding mechanism 50 by a signal from the sensing mechanism 30 on the basic unit 2. The rock shafts 100 and 101, intercepter arms 98 and 99 and control mechanism therefor are identical with that described and claimed in our prior application, referred to above. Suffice it to state herein that the operating mechanism for the rock shafts 100 and 101 comprises a cam 103, see FIGURES 3 and 12, on the drive shaft 91 for the card feeding mechanism 50. Cam 103 actuates a yoke 104 horizontally which is directly connected to one arm 99 at one end and to a corresponding opposed arm 98 through a lever 105 at its opposite end to rock the arms toward or away from each other, simultaneously. The operation of the yoke 104 is controlled by the engagement of a follower 97 on the yoke 104 with the cam 103. Follower 97 is actually mounted to slide on a latching lever 110 pivotally mounted on the yoke 104 and the latching lever cooperates with a latch plate 111. The cam follower 97 on the latching lever 110 is actuated by a bell crank 107 which, in turn, is actuated in one direction by a spring 108 and in the opposite direction by a Bowden wire 109 from the sensing mechanism 30 in the basic unit 2. When information on the primary card X in the basic unit 2 indicates that a secondary card Y should be punched the Bowden wire 109 actuates the bell crank 107 and the cam follower 97 on the latching lever 110 into engagement with the cam 103 to unlatch the yoke 104 and allow the cam 103 to rock the intercept arms 98 and 99 to card releasing position. If no secondary card Y is to be punched, the arms 98 and 99 remain in their card intercepting, latched, position.

In some installations it may be desirable to provide a card intercepting mechanism instead of a card release mechanism as shown to permit free advance of cards except when a signal is received to intercept the cards. Such a card intercepting mechanism is the same as that illustrated in FIGURE 12, except that it is reversed so that the yoke 104 normally holds the intercept arms 98 and 99 raised, but lowers the arms when the yoke is reciprocated.

*Secondary card feeding mechanism*

The secondary card feeding mechanism 50 also is the same as the primary card feeding mechanism in the basic unit as described and claimed in our prior application, referred to above. The feeding mechanism 50, however, is illustrated and described herein in sufficient detail to show its relation to the crossover primary card feeding mechanism 51 and driving means to operate them in synchronism.

Referring to FIGURES 8, 9 and 10, the primary card feeding mechanism 50 underlies the magazine station M and comprises an upper carriage 112 and a lower carriage 113. Carriages 112 and 113 are mounted for horizontal reciprocation in guides 114 located in spaced side rails 115, see FIGURE 10. Upper carriage 112 is in the form of a plate having spaced pickers 116, see FIGURE 9, adjacent its forward end and of a height to engage a single secondary card Y of a stack supported on spaced slats 117 at the magazine station M. The lower carriage 113 is in the form of an open frame.

The two carriages 112 and 113 are reciprocated in unison by a rotary driving means in the form of a disc 118 rotatable in a horizontal plane under the carriages. An eccentric driving pin 119 projects upwardly from the disc 118 and has a follower roller 120 thereon which engages the forward edge of the upper carriage 112. A second follower 121 on the eccentric pin 119 engages the rearward edge of a transverse rail 122 adjacent the forward end of the lower carriage 113. A series of springs 123 are connected between the forward end of the lower carriage 113 and the rearward end of the upper carriage 112 to yieldingly hold the carriages engaged with the follower rollers 120 and 121 on the eccentric driving pin 119. Thus, rotation of the disc 118 causes the carriages 112 and 113 to be reciprocated in unison as the eccentric pin 119 moves in a circular path. However, each of the carriages 112 and 113 may move relative to the other carriage against the action of the springs 123 so that the under carriage and rotating disc 118 may continue to operate when the upper carriage is restrained from forward movement, or vice-versa. A third follower roller 137 on eccentric driving pin 119 engages a slot in a counterbalancing rotating disc 138 to reduce vibration caused by the reciprocation of the carriages.

Driving disc 118 is mounted on the upper end of a vertical stub shaft 124 mounted in bearings in the box frame 78 and having a bevel gear 125 at its lower end meshing with a bevel gear 126 on the driving shaft 91, see FIGURES 3 and 9. Drive shaft 91, in turn, is coupled to the horizontal transmission shaft 94 by the bevel gears 127 and 128. Transmission shaft 94 is journaled in the side plate 79 of box frame 78 and has a toothed pulley 130 at its outer end between the side plates 15 and 79 of the machine frame, see FIGURE 6.

As shown in FIGURES 3 and 8, the transmission shaft 94 is driven from the main drive shaft 8 through a Gilmer type toothed belt 131 having meshing engagement with a toothed pulley 132 fast on the main drive shaft. Belt 131 extends from the toothed pulley 132 in its direction of motion over a toothed pulley 133 on a driving shaft 134 for the primary card return mechanism 57, then over an adjustable idler pulley 135, toothed pulley 130 on the transmission shaft 94 and idler pulley 136. As shown in FIGURE 8, the idler pulley 135 is mounted on a pivoted arm 139 to adapt the position of the pulley to be adjusted to hold the belt tight. The toothed pulleys 130 and 132 on the transmission shaft 94 and main drive shaft 8 and the beveled transmission gears 127 and 128 are so dimensioned that the upper and lower carriages 112 and 113 are reciprocated through their forward and return strokes during each revolution of the main drive shaft. As the main drive shaft 8 of the unit 1 is directly coupled to the main drive shaft 3 of the basic unit 2 the primary and secondary card feeding mechanism are operated in unison.

As the upper carriage 112 moves through a forward stroke it picks the lowermost secondary card Y from a stack at the magazine station M and advances it past a pivoted guide 140 and pivoted detent 102, see FIGURE 9. A pair of overlying rails 141 and 142, see FIGURE 10, are provided at each side of the machine for yieldingly gripping the ends of cards therebetween. The lower rail 142 at each side is mounted on a block 143 projecting upwardly from the lower carriage 113. Lower rails 142 project forwardly at each side of the machine throughout the plurality of processing and blank stations of the machine to the secondary card return unit 11. The upper rail 141 overlies rail 142 at each side and is attached thereto in spaced relation thereon by screws or shouldered pins which insure longitudinal movement with the lower rail. A spring tensioned runner 144 is located in a groove 145 in the upper rail 141, see FIGURE 10, which yieldingly engages the edge of a card between it and the lower rail 141. The upper rails 141 have lateral extensions 147 which project into slots 148 in stationary rails 150 to guide the movable rails as they reciprocate. A sheet metal retainer 149 overlies the outer edge of the upper rail 141 to retain it in slot 148. Thus, the edges of the secondary cards Y are yieldingly gripped between the rails as the card feeding mechanism advances and permits slippage of the cards relative to the rails during their return stroke.

As shown in FIGURE 9, the detents 102 are located adjacent the rails 141, 142 at each side of the machine, see FIGURES 7 and 9, to prevent return movement of the cards Y with the card feeding mechanism and properly position the cards at their respective stations.

Secondary cards Y are only fed when a signal is produced from a primary card X in the basic unit 2. For this purpose a stopping mechanism is provided for holding the upper carriage 112 at the rearward end of its stroke to prevent it from advancing a card until a signal is received. This stopping mechanism is illustrated in FIGURES 10 and 11 as comprising a detent 152 engaging a stop 153 depending from the plate of the upper carriage 112. Detent 152 is formed at the end of a bar 155 mounted to slide in a block 156 at one side of the machine. The bar 155 is actuated to holding and releasing positions by an arm 157 mounted on and projecting upwardly from the rock shaft 100 of the interrupt mechanism, see FIGURE 7. Arm 157 has spring fingers 158 which engage the outward end of the bar 155. Thus, when the information on a primary card X indicates that a secondary card Y should be produced the sensing mechanism 30 produces a signal through the Bowden wire 109, see FIGURE 12, and acts through the bell crank lever 107 to release a latch 110 and allow the cam 103 to reciprocate the yoke 104 to the right as viewed in FIGURE 12 and rock the rock shafts 100 and 101. The rock shaft 100 moves counterclockwise as viewed in FIGURES 10 and acts through the arm 157 and bar 155 to withdraw the detent 152 to release the upper carriage 112. Following release of carriage 112 the eccentric pin 119 on driving disc 118 will reciprocate the carriage through a forward stroke to advance a secondary card from the magazine M.

During operation, all of the stations in the secondary unit 1 between the magazine M and punching station P would be filled with secondary cards Y while the primary cards were feeding through the basic unit 2. When information is sensed in the sensing mechanism 30 of the basic unit 2 that a secondary card Y should be punched, the information is transmitted through Bowden wires 109, 70 to yoke 104 for actuating card intercept 60 and punch elements 65 of the auxiliary unit 1 during the advance of the primary card to the punching station P. Thus, primary and secondary cards X and Y are located at the punching stations P in their respective units. During the next cycle of operation of the basic and auxiliary units 2 and 1, the secondary card is punched and the upper carriage 112 released so that after a punching operation the primary and secondary cards will advance in unison through successive stations in their respective units.

*Crossover primary card feeding mechanism*

The crossover primary card feeding mechanism receives primary cards X from the basic unit 2 and feeds them across auxiliary unit 1 in timed relation with the feeding of the secondary cards Y along the auxiliary unit. The primary card feeding mechanism 51 is illustrated in FIGURES 3, 6, 7, 8, 13, 14 and 15.

As shown diagrammatically in FIGURE 3, the primary card feeding mechanism 51 comprises a pair of spaced conveyor belts 160 and 161. Belts 160 and 161 are of the Gilmer toothed type having spaced teeth projecting from one side and are mounted on and driven by toothed pulleys. Belt 160 has a generally horizontal run between pulley 162 at the left to pulley 163 at the right as viewed in FIGURE 3. Belt 160 reverses at the bottom of pulleys 162 and 163 and extends over pulleys 164 and 165 of oscillating mechanism 62, later to be described in detail, and then over the toothed driving pulley 166. Belt 161 also has a horizontal run in the same plane as the horizontal run of the belt 160 between toothed pulleys 167 and 168 and extends over another pair of pulleys 169 and 170 of the oscillating mechanism 52 and then over a toothed driving pulley 171.

Each belt 160 and 161 has a plurality of spaced card pushing lugs 174 projecting upwardly therefrom for engaging the rearward edge of a primary card X and advancing it across the machine. As shown in detail in FIGURE 13, the pushing lugs 174 are of relatively narrow width and the intermediate pulleys 164, 165 and 169, 170 have a central annular recess 175 to provide a clearance space for the pushing lugs. As shown in FIGURES 3, 6 and 14, pulleys 162 and 167 at the left as viewed in FIGURE 3 are mounted on a shaft 176 and the shaft is journaled in a bracket plate 177 supported between bulkhead plates 18 and 19 and located between the pulleys. Pulleys 163 and 168 are also mounted on a similar shaft 178 journaled in the bracket 177 between the pulleys at the opposite or right hand side of the machine. As shown in FIGURES 13 and 14, the horizontal run of each of the belts 160 and 161 overlie platforms 179 and 180 projecting inwardly toward each other from the bulkhead plates 18 and 19 of the machine frame. The position of the pushing lugs 174 and thereby the position of a primary card at the printing station Pr may be adjusted by adjusting the position of the belts 160 and 161 on the pulleys.

As will be observed by reference to FIGURE 6, a pair of rubber tired card transfer wheels 172 are mounted on a sleeve 173 on shaft 176 for transferring primary cards X from the end of the basic unit 2 to the belts 160 and 161. The sleeve 173 and rubber tired wheels thereon are driven by a belt 193 from the driving mechanism, see FIGURE 15. A pinching roller 194 overlies the rubber tired wheels 172 and cooperates therewith in transferring primary cards.

Referring now to FIGURES 3 and 13, the pulleys 164 and 169 of the oscillating mechanism 52 for the separate belts 160 and 161 are mounted at the ends of a shaft 181 while the pulleys 165 and 170 are mounted on the ends of a shaft 182. Shafts 181 and 182 are journaled intermediate their ends in bearings on a T-shaped lever 183 pivotally mounted at its lower end.

T-shaped lever 183, the shafts 181 and 182 journaled thereon and the pulleys 164, 165 and 169, 170 constitute the oscillating mechanism 52 for transforming the rotary motion of driving shaft 184 to an intermediate linear movement of the belts 160 and 161. To this end, the driving pulleys 166 and 171 are mounted fast on a driving shaft 184 extending at right angles to the main drive shaft 8 and connected thereto through the angular spline gears 185 and 186. The spline gears 185 and 186 are so dimensioned as to drive the shaft 184 at one half the speed of the main drive shaft 8, but the pulleys 166 and 171 are so dimensioned as to advance the belts 160 and 161 and card X carried thereby through the distance of one station during each revolution of the main drive shaft 8. Thus, both the secondary card feeding means 50 and the primary card feeding mechanism 51 are driven in synchronism from the main drive shaft 8.

Referring now to FIGURES 14 and 15 it will be observed that driving shaft 184 also mounts a double ended cam 187 between the driving pulleys 166 and 177 which engages a follower 188 on the T-shaped lever intermediate its ends. When the T-shaped lever 183 is moved by cam 187 to the right from the position illustrated in FIGURE 14 to that illustrated in FIGURE 15 the card conveying portions of belts 160 or 161 between the pulleys 164, 165 and 169, 170 will remain stationary. However, when the T-shaped lever 183 is moved to the left from the position shown in FIGURE 15 to the position shown in FIGURE 14, these card conveying portions of the conveyor belts 160 and 161 will move to the right and at velocity twice that of the remainder of the belts. In other words, as the T-shaped lever 183 moves towards the right the pulleys 164 and 169 take up all of the slack of the belts 160 and 161 delivered from the driving pulleys 166 and 171 while at the same time the pulleys 165 and 170 at the opposite side of the lever pay out the belts to the driving pulleys. However, when the T-shaped lever 183 moves to the left, the pulleys 165 and 170 of the oscillating mechanism pull the belts 160 and 161 from the right hand pulleys 163 and 168 at the same time that the driving pulleys 166 and 171 continue to pull the belts at a constant rate from these right hand pulleys. As the result of these operations on the belts at the right hand side of the lever 183 the portions of the belts at the left hand side of the lever must move at twice the velocity of the section of the belts leaving the driving pulleys 166 and 171. To accommodate this increase in velocity, sections of the belts 160 and 161 at the left hand side of the lever will be payed out by pulleys 164 and 169 as they move to the left at the same time as the driving pulleys 166 and 177 advance the belts.

In order to provide for the sudden changes in velocity of belts 160 and 161 when the lever 183 changes its direction of movement, idler pulleys 189 are mounted on one end of pivoted levers 190 for engaging the belts between the driving pulleys 166, 171 and pulleys 164, 169. Springs 191 rock the levers 190 to the right as viewed in FIGURES 14 and 15 and stops 192 on the frame engage the sides of openings at the opposite ends of the levers to limit their rocking movement.

As shown in FIGURE 13, a platform 200 overlies the belts 160 and 161 and has openings 201, 202 and 203 therein. A cross strut 204 underlies the opening 202 and projects upwardly therein. The arrangement of the platform 200 is such that as a primary card X is advanced across the machine by conveyor belts 160 and 161, its ends overlie the platform 200; its intermediate portion overlies the top of the cross strut 204 and the portions therebetween underlie the platform. The purpose of this construction is to provide frictional control of the primary card to hold it against the pushing lugs 174 and accurately align it with a secondary card at the printing station Pr.

At the time that the end of a primary card X overlies platform 200 at the printing station Pr, see FIGURE 13, a corresponding secondary card Y overlies the primary card. The pressing head 40 of the printing mechanism then is operated to press the two cards together against the platform 200.

*Card moistening mechanism*

A card moistening mechanism 207 is provided at the moistening station Mo to moisten the bottom of a secondary card Y with a liquid solvent for the carbon ink of the indicia printed on the top of the primary card X. Card moistening mechanism 207 comprises a porous moistening head 208 of felt or the like to which liquid solvent is supplied and the mechanism is so constructed and arranged as to move the moistening head through a full stroke to moisten a card when a card is present at the moistening station Mo, but operate the head through less than a full stroke when no card is present at the moistening station Mo. The card moistening mechanism 207 is illustrated in FIGURES 13 and 16 to 22 inclusive.

Refering to FIGURES 13 and 16, the moistening mechanism 207 comprises a generally rectangular shaped reciprocating plate 209, a cross head 210 mounted to reciprocate in the plate and a connecting rod 211 between the cross head and crank pin 54 of the crank shaft 55. Plate 209 is mounted to slide vertically in guideways 212 and 213 supported on the machine frame and the moistening head 208 is adjustably clamped to the plate 209 at its upper end. Plate 209 has a lower rectangular opening 214 to accommodate the throw of the crank pin 54 and a narrower rectangular opening 215 to provide vertical guideways 216 at the sides thereof in which the cross head 210 reciprocates relative to the plate. One end of the connecting rod 211 has a bearing 217 embracing the crank pin 54 and a wrist pin 218 at its opposite end connected to the cross head 210. Connecting rod 211 also has a boss 219 projecting from one side thereof and mounts a pin 220 laterally of the wrist pin 218 which projects therefrom at right angles.

Plate 209 and connecting rod 211 are connected by a link 221 having its upper end pivotally connected to the pin 220 and an open circular slot 222 at its lower end which embraces a circular abutment 223 projecting from the plate. The circular abutment 223 is mounted eccentrically on a pin 224 to adjust the height of the abutment relative to the pin 220 on the crosshead. Thus, the link 221 provides a connection between the connecting rod 211 and plate 209 for moving the latter downwardly relative to the crosshead 210 upon rocking movement of the connecting rod on wrist pin 218 during its initial upward movement and relates the plate upon continued upward movement.

The upper end of the crosshead 210 has a centrally located slot 228 and a centrally located bore 229 to receive the lower reduced threaded end of an upwardly projecting post 230. The threaded connection between the post 230 and crosshead 210 permits adjustment of the location of the moistening head 208 relative to a card Y. The upper end of the post 230 is bifurcated to straddle plate 209 above openings 215 and the bifurcated ends extend through an abutment 231 projecting laterally from opposite sides of the plate. The upper bifurcated ends of the post 230 are recessed at 232 to provide a latching shoulder 233. A spring 234 surrounds the post and acts between the abutment 231 on the plate 209 and the crosshead 210 at the bottom of the central slot 228 to yieldingly hold the plate and crosshead in extended relation, the relative movement between the crosshead 210 and plate 209 being limited by the engagement of the abutment 223 with the end of the link 220. A latch 235 is mounted on the plate 209 to slide laterally thereof and has latching lugs 236 for engagement with the notched shoulders or latch keeper 233 in the post 230.

Plate 209 also mounts a pump 236 for cooperation with an abutment 237 mounted on the crosshead 210. Abutment 237 has a screw threaded engagement with a bracket 238 attached to and extending laterally from the crosshead 210 so that the position of the abutment may be adjusted relative to the pump 236. Pump 236 is operated to supply liquid solvent to the moistening head 208 by the relative movement between the plate 209 and crosshead 210. However, when the plate 209 in its lowered position is latched to the crosshead 210 by the latch 235 no relative movement between the parts is produced to operate the pump and the moistening head 208 moves through less than a full stroke. Flexible conduit connections 239 and 240 are provided between the pump 236 and moistening head 208 and between the pump and a source of supply of the solvent liquid, not shown, to permit relative movement between the pump and moistening head and reciprocating movement of the pump.

The card moistening mechanism 207 is driven by the crank shaft 53, see FIGURE 3, in timed relation with the operation of the secondary card feeding mechanism 50 to wet the secondary card Y with solvent while held at the moistening station Mo by pivoted detents 102 during the return stroke of the card feeding mechanism. As shown in FIGURES 3 and 13, crank shaft 53 has a gear 241 meshing with a gear 242 on driving shaft 184 for the primary card feeding mechanism 51 which, in turn, is driven from the main drive shaft 8 through helical type gears 185 and 186.

During rotation of the crank shaft 53 through one complet revolution the crank pin 54 moves the lower end of connecting rod 211 through the different angular positions illustrated in FIGURES 16 through 20. When the crank pin 54, connecting rod 211 and crosshead 210 are at the bottom of a stroke in the dead center position illustrted in FIGURE 16, the latch 235 is located above the latch keeper 233. As the crank pin 54 moves counterclockwise approximately 45° from the position illustrated in FIGURE 16 to that illustrated in FIGURE 19, the boss 219 projecting laterally from the connecting rod 211, link 221 connected thereto by the laterally offset pin 220 and plate 209 engaged by the other end of the link all move downwardly and relative to the crosshead 210 until the latch 235 is aligned with its keeper 233. With this relative position of the parts the latch 235 will engage the keeper 233 to latch the plate 209 in its lowered position to the crosshead 210 during the remainder of the upstroke of the connecting rod, or will not engage the keeper depending upon the position of a cam 243 in the guideway 212 at the side of plate 209. If latch 235 does not engage keeper 233, the plate 209 will move to its extended position relative to crosshead 210 during the next 150° of rotation of crank shaft 53 to the upper dead center position illustrated in FIGURE 17.

If cam 243 projects outwardly from the guideway 212 as illustrated in FIGURES 16 and 17 it prevents the latch 235 from engaging the keeper 233 so that the plate 209 and moistening head 208 move through a full stroke to engage a card. Upon engagement of the moistening head 207 with a card the plate 209 will stop relative to the movement of the crosshead 210 and compress spring 234 therebetween. On the other hand, if the cam 243 is retracted as illustrated in FIGURES 19 and 20, the latch 235 engages the keeper 233 and latches the plate 209 and moistening head 207 in its lowered position relative to the crosshead 210. The plate 209 and moistening head 208 then move through less than a full stroke as illustrated in FIGURE 20 to prevent solvent from being applied when no card is present at the moistening station.

The relative rocking motion of the connecting rod 211 from the position illustrated in FIGURE 18 to that illustrated in FIGURE 19 also controls the operation of the pump 236 to supply solvent liquid to the moistening head 208. As previously explained, the rocking movement of the connecting rod 211 acting through link 221 depresses the plate 209 relative to the crosshead 210 so that the pump 236 moves away from the abutment 237 during which time the pump draws in a quantity of the solvent liquid. This relative motion occurs during the first quarter of a revolution of the crank 53. During the next quarter of a revolution of the crank shaft 53 to the position illustrated in FIGURE 17 the plate 209 and pump 236 carried thereon moves upwardly with respect to the crosshead 210 under the action of the spring 234, if the plate is not latched to the crosshead. Such relative movement of the pump 236 and abutment 237 operates the pump to discharge solvent liquid to the moistening head 208. On the other hand, when the plate 209 in its lowered position is latched to the crosshead 210 they move upwardly as a unit to prevent relative movement between the pump 236 and abutment 237. Thus, when the plate 209 and crosshead 210 are latched to each other the pump is not operated to supply solvent liquid to the moistening head 208 during the upstroke of the crosshead 210, as shown in FIGURE 20.

The latch 235 is shown in detail in FIGURES 22 and 23 comprising a pair of bars 244 and 245 located at opposite sides of the plate 209, respectively. Bars 244 and 245 are connected to each other and supported on plate 209 by sleeved pins 246, 247 and 248 attached at their ends to the bars and extending through openings 249 and 250 in plate 209. Opening 249 is a circular hole in which a roller sleeve 251 on pin 246 at the end of the latch 235 is located for engaging the face of cam 243 and opening 250 is a slot in which the sleeved pins 247 and 248 may slide. A pin 252 extends through a hole in the plate 209 and has a sleeve 253 with reduced ends 254 extending through slots 255 in the bars 244 and 245. Springs 256 connect the ends of pin 252, fixed with respect to plate 209, and the ends of the pin 247, fixed to the bars 244 and 245, which tend to slide the latch 235 to the left as viewed in FIGURE 23.

The latch 235 also comprises an I-shaped latching element 257 having the shouldered latching lugs 236 for engaging the shoulders on the bifurcated portions of the latch keeper 233. The I-shaped latch element 257 projects laterally in the slot 250 in plate 209 and has a pin 264 extending outwardly through slots 263 in the bars 244 and 245. The pin 264 extends through the sleeve 262 and has springs 265 connected between its ends and the ends of the pin 248 to permit the remainder of the latch 235 to move to the right as viewed in FIGURE 23 relative to the I-shaped latch element 257 until it is released by relative movement of plate 209 and crosshead 210. Thus, the latch 235 is yieldingly urged to the left as viewed in FIGURE 23 to engage the shoulders 236 of the T-shaped latch element 257 with the shoulders of the notched keeper 233 in the bifurcated portions of post 230 straddling the plate 209, and the latch 235 permitted to move relative to the latching element 257 when the latter is engaged with its keeper 233. However, the latch 235 may be moved bodily to the right against the action of the springs 256 by the cam 243.

The pump, shown in detail in FIGURE 21, comprises a housing 270 attached to the plate 209 by bolts 271. Within the housing 270 is a chamber 272 having an inlet valve 273 and an outlet valve 274. A piston 275 is mounted to reciprocate in a cylindrical sleeve 276 in the housing and projects into chamber 272. Projecting from the opposite end of the piston 275 is a stem 277 which also projects through an adjustable cap 278. Upward movement of the piston 275 is limited by an abutment 279 held in position by a spring 280 acting between it and the adjustable cap 278. A second spring 281 acts between the bottom of the chamber 272 and the lower end of piston 275 to raise the piston into engagement with the abutment 279. Spring 280 is more resistant than the spring 281 so that the piston is limited in its upward movement. The adjustable cap 278 has a screw threaded engagement with a nipple 282 on the housing 270 whereby to adjust the length of stem 277 projecting from the housing and thereby the length of the stroke of the piston and the amount of liquid delivered from the chamber 272. The adjustable cap 278 is held in adjusted position by a detent spring 283.

The abutment 237 mounted on the crosshead 210 for operating the pump 236 is in the form of a plunger 284 slidable in a thimble sleeve 285 having external screw threads 286 for screwing it into bracket 238. Plunger 284 has a screw threaded engagement with the lower end of a stud 287 extending through the thimble sleeve 285 and having a head 288 engaging the end of the sleeve. A spring 289 acts between a shoulder on plunger 284 and thimble sleeve 285 to hold the plunger depressed but yields to permit relative movement therebetween. The entire abutment 237 may be adjusted relative to the stem 277 of pump 236 by turning the thimble sleeve 285 in bracket 238, which then clamps to secure it in place.

Referring again to FIGURE 16, the latch 235 is controlled by cam 243. Cam 243 is formed on the edge of a rocking plate positioned in a slot 295 in guideway 212 and is pivotally mounted at one end on a pin 296. The edge of the cam 243 is positioned in the path of a roller sleeve 251 surrounding pin 246 of latch 235. With the cam 243 in the position illustrated in FIGURES 16 and 17, upward movement of the plate 209 relative to the cam moves the latch 235 to the right or unlatching position against the action of the springs 256. However, when the cam is in the position illustrated in FIGURES 19 and 20 the latch 235 is moved to the left or latching position by springs 256.

The position of the cam 243 is controlled by a card detecting mechanism 297 overlying the moistening station Mo, see FIGURE 7, and a Bowden wire 298. Bowden wire 298 has a terminal sheath 299 at one end, see FIGURES 16 and 23, clamped in guideway 212 to align the end of the sliding wire with the rearward edge of cam 243. A terminal sheath 300 adjacent the opposite end of Bowden wire 298 is clamped in the housing 301 of the card detecting mechanism 297, see FIGURE 24, and the sliding wire has a stem 302 at its end slidable in a counterbore 303 therein. Stem 302 has an annular shoulder 304 and a spring 305 acting between the shoulder and counterbore in the housing 301 yieldingly presses the sliding wire to the left as viewed in FIGURE 24 to protect its opposite end and cam 243 into the path of the latch 235, see FIGURES 16 and 23.

As illustrated in FIGURE 24, the housing of the card detecting mechanism 297 has a card detecting arm 306 pivotally mounted at one end in a vertical slot 307 therein. The end of the card detecting arm 306 adjacent the stem 302 of the Bowden wire 298 has a vertical shoulder 308. When no card is present at the moistening station Mo, the pivoted card detecting arm 306 falls downwardly to the full line position illustrated in FIGURE 24 under the action of leaf spring 309 to position shoulder 308 below the end of stem 302. However, when a card moves to the moistening station Mo, it slides under and lifts the arm 306 to the dotted line position illustrated in FIGURE 24 to position shoulder 308 of card detecting arm 306 in alignment with the end of the stem 302.

Thus, when plate 209 of moistening mechanism 207 rises, the roller sleeve 251 of latch 235 engages and tends to rock the cam 243 counterclockwise as viewed in FIGURE 16 which motion is transmitted through the Bowden wire 298 and actuating stem 302 against the action of the spring 304, see FIGURE 24, if no card is present. However, if a card is present at the moistening station Mo, the end of the stem 302 of Bowden wire 298 engages the shoulder 308 on the card detecting arm 306 and holds the cam 243 in its extended position.

*Card printing mechanism*

When a primary card X has been moved to the printing station Pr by the card feeding mechanism 51 and a corresponding secondary card Y has been moved to the printing station by the card feeding mechanism 50 they overlie each other as shown in FIGURES 1 and 13. A printing mechanism 310 at printing station Pr actuates the pressing head 40 to transfer printed indicia from the primary card X to the secondary card Y. The solvent liquid applied to the secondary card Y at the moistening station Mo dissolves part of the carbon ink of the indicia printed on the primary card and causes it to transfer to the surface of the secondary card.

The printing mechanism 310 is shown in FIGURES 7, 13, 25 and 26. As previously described with respect to FIGURE 7, the pressing head 40 is mounted on the cross bar of U-shaped bail 42 for adjustment laterally thereof to press at any position along the card Y. Bail 42 is rocked by rods 311 and 312 connected at their upper end to the spaced sides of the bail and at their lower ends to the ends of an actuating plate 313. Thus, when the actuating plate 313 is raised or lowered it raises or lowers the pressing head 40. Although not shown the rods 311 and 312 have means for adjusting their length, such as turnbuckles, to vary the printing pressure.

The operating mechanism for actuating plate 313 is identical with the card moistening mechanisms 207 but inverted as illustrated in FIGURES 25 and 26. In other words, the printing mechanism 310 comprises a sliding plate 314, crosshead 315, connecting rod 316, latch 317 and link 318 and cam 319 corresponding to the plate 209, crosshead 210, connecting rod 211, line 221 and latch 235 of the moistening mechanism. The crank pin 55 at the opposite end of the crank shaft 53 from the crank pin 54 actuates the connecting rod 316 one hundred and eighty degrees out of phase with the connecting rod 211 of the moistening mechanism to lower plate 314 while plate 209 is being raised. Thus, plate 209 moistens a preceding card. The actuating plate 313 for the pressing head 40 is attached to the upper end of the sliding plate 314 by means of bolts 320. Latch 317 is controlled by the cam 319 to latch the plate 314 to the crosshead 315 if no secondary card Y is present at the printing station to move the pressing head 40 through less than a full stroke. However, if a card Y is present at the printing station P*r* the plate 314 remains unlatched and actuates the pressing head through a full stroke to transfer indicia from the primary to the secondary card.

The position of the cam 319 is controlled by a card detecting mechanism at the printing station P*r* identical with the card detecting mechanism 299, illustrated in FIGURE 24. If no card Y is present at the printing station a card detecting arm 306 is lowered to permit the cam 319 to be moved by the latch 317 and cause latch 317 to engage the crosshead 315. If a card Y is present at the printing station P*r* it raises the card detecting arm 206 in position to be engaged by the stem 302 and thereby hold the cam 319 and actuate the latch 317 to unlatching position.

*Card return mechanisms*

After the corresponding primary and secondary cards X and Y leave the printing station P*r* they are returned to the sorter and stacker in the basic and auxiliary units 2 and 1, respectively. As illustrated in FIGURE 1 the secondary card return 11 is located at the end of the unit.

The card return mechanism 11 is illustrated in detail in FIGURES 3, 6, 8 and 13. The description will be directed to FIGURE 3 which best illustrates the entire card return mechanism 11 as comprising an endless conveyor belt 325 and a back-up conveyor 326 between which the secondary cards Y are gripped and conveyed. Belt 325 is of the toothed Gilmer type extending over a toothed pulley 327 on the main drive shaft 8, then over an idler pulley 328, a pulley 329 on shaft 134 and then over another idler pulley 330 back to the pulley 327.

The back-up conveyor 326 is a continuous belt extending over a pulley 331 located forwardly of the pulley 327 then rearwardly over the belt 325 and pulley 327 downwardly around the idler pulley 328 and over a pulley 332 located forwardly of the pulley 329. The belt then returns around a series of pulleys 333, 334 and 335. A pinch roller 338 cooperates with the forward end of the back-up conveyor 326 to grip a card delivered by the card feeding mechanism 50. Referring to FIGURE 8, the downward run of the belt 325 between the pulley 327 and idler pulley 328 overlies a slightly arched plate 336 to insure tension between it and the downward run of the back-up belt 326.

Thus, secondary cards Y are advanced by the card feeding mechanism 50 into the bight between the card return conveyor belt 325, pinch roller 338 and then between the conveyor 325 and the back-up conveyor belt 326. The cooperating belts then convey the cards Y downwardly and rearwardly into the conveyor 337 of the sorter and stacker 27. The sorter and stacker 27 is identical with that described and claimed in our prior application and comprises guide chutes which are lowered from the individual bins as controlled by signals from the sensing mechanism in the basic unit 2 or auxiliary unit 1.

The card return mechanism 12 for returning primary cards from the top to the bottom of the unit 1 is the same as the card return unit described and claimed in our prior application, referred to above, and similar to the card return unit 11 described above. The primary card return unit 12, however, includes an additional crossover conveyor 57 at the base of the machine located below and extending at right angles to the secondary card return belts 325 and 326.

The crossover primary card return conveyor 57 is in the form of a continuous belt 341 extending over a pulley 342 on a shaft 343 at one end and over an idler pulley 344 at its other end. The pulleys 342 and 344 are so located that the upper and lower runs of the belt straddle the return conveyor belts 325 and 326. A continuous back-up belt 345 underlies the belt 341 and engages the bottom run thereof to grip and convey primary cards X therebetween.

Shaft 343 drives pulley 342, and, in turn, is driven from the shaft 134 through beveled gears 346 and 347. Shaft 134 also mounts a gear 348 which meshes with gear 349 on a lay shaft 350. A driving pulley 351 on lay shaft 350 drives the conveyors 327 of the sorter and stacker 27. Another shaft 352 is driven from the lay shaft through beveled gear 353, and 354 for operating the sorter and stacker 27.

Primary cards X are delivered by the crossover conveyors 341, 345 from the right hand side to the left hand side of the secondary card processing unit 1 as shown in FIGURE 1 and delivers the cards to a conveyor in the basic unit 2 corresponding to the conveyor 327 in the auxiliary unit 1. This conveyor then delivers the primary cards X to the stacker and sorter in the basic unit 2 where the cards are sorted according to information sensed at the sensing station S of the basic or auxiliary unit and stacked in separate stacks in the plurality of bins. Thus, the card processing unit 1 operates in conjunction with the basic unit 2 to feed, punch and transfer indicia onto a secondary card Y from information contained on a primary card X and then return the cards to their respective units.

*Mode of operation*

For the purpose of describing the mode of operation, let it be assumed that primary cards X are stacked in the magazine at the magazine station M of the basic unit 2 and that secondary cards Y are stacked in the magazine M of the auxiliary unit 1; and that secondary cards are positioned at each of the blank stations B, sensing station S if a sensing station is used, and punching station P of the auxiliary unit 1. The card intercept arms 98 and 99, see FIGURE 2, will be lowered in front of the cards Y at each of the stations to hold the cards from advancing and the detents 102, see FIGURE 9, will be at the rear of the cards to hold the cards from moving rearwardly with the card feeding mechanism in the auxiliary unit 1.

Upon operation of the motor 4 in the basic unit 2, see FIGURE 1, main drive shaft 3 is rotated and through couplings 5 and 9 rotates the main drive shaft 8 of the auxiliary unit 1. Referring to FIGURE 3, the rotation of the main drive shaft 8 of the auxiliary unit is transmitted through the belt 131, transmission shaft 94 and driving shaft 91 to operate the secondary card feeding mechanism 50 and work operator 59. Simultaneously, rotation of drive shaft 8 is transmitted through spline gears 185 and 186, driving shaft 184 and pulleys 166 and 171 to operate the conveyor belts 160 and 161 of the primary card feeding mechanism 51 and oscillating mechanism 52 therefor.

As the drive shaft 3 of the basic unit 2 and main drive shaft 8 of the auxiliary unit 1 are directly coupled, the card feeding mechanisms 50 and 51 and work operator 59 of the auxiliary unit 1 operate in exact synchronism with the corresponding card feeding mechanisms and work operator of the basic unit 2. In other words, when the card feeding mechanism of the basic unit 2 operates to advance a primary card from the magazine M, the secondary card feeding mechanism 50 of the auxiliary unit 1 is at exactly the same position to advance a secondary card from the magazine M. Also the sensing and punching mechanisms 30 and 31 actuated by the work operators 59 in the basic and auxiliary units 2 and 1 start to rise at the same time, move through their reciprocating cycle and are returned to their initial position in exact synchronism.

The card feeding mechanisms 50 in both the auxiliary and basic units 1 and 2 advance cards during a forward stroke and then move relative to the cards during a return stroke. During the return stroke of the card feeding mechanisms the cards are held stationary by the detents 102, see FIGURE 9. After the card feeding mechanism has started a forward stroke to advance a primary card X in the basic unit 2 and before the card arrives at the sensing station S, the work operator initiates operation of the sensing mechanism through an upstroke so that after the primary card has stopped at the sensing station, the sensing elements 64, see FIGURE 4, will sense information punched in the card X.

If the information on the primary card X indicates that a secondary card Y is to be punched a sensing element 64 transmits a signal to the auxiliary unit 1. For example, if a particular date punched in the primary card X indicates that a secondary card Y is to be punched, a feeler element 64 is preset during its upstroke to transmit a signal through the Bowden wire 109, see FIGURES 1 and 4. At the end of its downstroke, feeler element 64 actuates Bowden wire 109 which initiates actuation of the yoke 104 horizontally by cam 103, see FIGURE 12. Cam 103 is so shaped as to lift the card intercept arms 98 and 99 to release the secondary cards at the plurality of stations in the auxiliary unit prior to the next forward stroke of the card feeding mechanism 50. Reciprocation of the yoke 104 also withdraws the detent latch 152, see FIGURES 10 and 11, to release the carriage 112 of the secondary card feeding mechanism 50. Simultaneously, the information to be punched in the secondary card Y is sensed by the feeler elements 64, see FIGURE 4, of the sensing mechanism in the basic unit 2 and the information is transmitted to corresponding punching elements 65, see FIGURE 5, in the punching mechanism 31 in the auxiliary unit 1 by the Bowden wires 70.

The sensing elements 64 sense the information on a primary card X during the return stroke of the primary card feeding mechanism and operate through the Bowden wires 70 and 109 at the end of their downstroke to preset punching elements 65 at the end of their downstroke. As the reciprocation of the feeling and punching mechanisms 30 and 31 lags the reciprocation of the card feeding mechanism, information sensed at the sensing station in the basic unit is transmitted through the Bowden wires 109 and 70 to preset the card feeding mechanism 50 and punching element 65 in the auxiliary unit 1 while the sensed primary card is being advanced to the punching station. During the next upstroke of the punching mechanism 31 the information sensed in the primary card X is punched in a secondary card Y so that the corresponding sensed primary card and punched secondary cards are both located at the punching station in their respective units. Simultaneously with punching of secondary card Y, the primary card X may be punched, for example, to record the reproduction of a secondary card.

The sensed primary card X and punched secondary card Y then are advanced by their respective card feeding mechanisms 50 through successive stations in exact synchronism. The primary card X continues to move through successive stations in the basic unit 2 until it reaches the end of the unit at which time the card is transferred to the crossover primary card conveyor 51 of the auxiliary unit 1. As shown in FIGURES 14 and 15, the primary card is fed from the basic unit 2 onto the crossover conveyor 51 by the rubber tired transfer wheels 172 on shaft 176 and cooperating guide roller 194 onto the top of the spaced conveyor belts 160 and 161. The oscillating mechanism 5 operates conveyor belts 160 and 161 intermittently during which movement the pusher lugs 174 engage the rearward edge of the primary card and advance it to the printing station Pr. During the movement of the primary card X to printing station Pr by conveyor belts 160 and 161, the end of the card having the indicia printed thereon rides onto the platform 200 under the raised pressing head 40 of the printing mechanism 310 shown in dotted line position in FIGURE 13.

During the movement of the primary card X from the punching station P of the basic unit to the printing station Pr the corresponding secondary card Y having the information punched therein is advanced from the punching station P of the auxiliary unit to the printing station Pr to overlie the primary card Y. When the secondary card arrives at the moistening station Mo it rides under the pivoted arm 306 of the card detecting mechanism 297, see FIGURES 23 and 24 and raises the shoulder 308 into alignment with the end of the stem 302 at the end of Bowden wire 298. This holds the cam 243 of the moistening mechanism 207 in its projected position illustrated in FIGURES 16 and 17. As the moistening mechanism 207 is reciprocated by the crank shaft 53, the latch element 235 is held in releasing position so that the plate 209 and moistening head 208 move through a full stroke as shown in FIGURE 17 to engage and apply liquid solvent to the bottom of the secondary card Y. During the rotation of the crank shaft 53 from the position shown in FIGURE 16 to the position shown in FIGURE 19, plate 209 carrying the pump 236 is moved downwardly relative to the crosshead 210 and abutment 237 carried thereby, due to the rocking movement of connecting rod 211 to draw a supply of liquid solvent into the pump chamber 272, see FIGURE 24. During rotation of crank shaft 53 from the position illustrated in FIGURE 19 to that illustrated in FIGURE 17 the plate 109 and pump thereon moves upwardly with respect to the crosshead 210 and abutment 237 thereon to cause the pump to deliver solvent liquid to the moistening head 208.

The moistened secondary card Y is then advanced by the card feeding mechanism 50 during its next forward stroke to the printing station Pr where it overlies its corresponding primary card X. Also the portion of the secondary card Y which has been moistened with a solvent is located over the portion of the primary card where the indicia is printed. When the primary and secondary cards X and Y have been advanced to overlie each other at the printing station Pr, the printing mechanism 310 is operated by the crank pin 55 on the crank shaft 53 to depress the pressing head 40 as illustrated in FIGURE 13. The solvent on the secondary card dissolves a portion of the carbon ink of the indicia printed on the primary card and transfers it to the secondary card. This indicia may comprise the name and address of a person to whom the secondary card is to be sent.

After a printing operation, the primary and secondary cards pass each other in their right angular paths from the printing station Pr and the primary cards X are returned by the return card conveyor 12, see FIGURE 1 and crossover return card conveyor 57, see FIGURES 3 and 8, back to the sorter and stacker of the basic unit 2. Secondary cards Y are returned by the return conveyor 11, see FIGURES 1 and 3 which delivers them to the sorter and stacker 27 of the auxiliary unit 1.

If no secondary card Y is to be processed, the primary card X advances through the basic unit, 2, crossover card feeding mechanism 51 and card return conveyors 12 and 57 to the sorter and stacker in the basic unit as previously described. However, when no secondary card is to be processed the moistening mechanism 207 and printing mechanism 310 move through less than a full stroke. Operation of the moistening mechanism 207 and printing mechanism 310 is controlled by the card detector 297 at each of the moistening and printing stations Mo and Pr. If no card is present at either station the pivoted arm 306 releases the cam 234 or 319, respectively, which is free to move to the left as viewed in FIGURES 19 and 20 so that the latch 235 or 317 on plate 209 or 314 engages its keeper 233 with the plate depressed so that the moistening head 208 or printing head 40 moves through less than a full stroke. Furthermore, the latching of the plate 209 of the moistening mechanism 207 in a depressed position relative to the crosshead 210 prevents operation of the pump 236 when no card is present at the moistening station.

Thus, it will be observed that information sensed on primary cards in the basic unit 2 controls operation of the card feeding mechanism 50 in the auxiliary unit 1 and presets punches to punch at least a portion of the information on the primary card into the secondary card Y. The arrangement also provides for transferring printed indicia from a primary card onto a corresponding secondary card.

While a single embodiment of the invention is herein illustrated and described, it is to be understood that changes may be made in the construction and arrangement of elements without departing from the spirit or scope of the invention. Therefore, without limitation in this respect, the invention is defined by the following claims.

We claim:

1. In a record processing system of the type utilizing a machine unit through which one set of cards are fed having information thereon and which includes a plurality of processing mechanisms including a card feeding means, a sensing means for producing a signal from information contained on said cards and a drive shaft directly connected to and continuously operating the processing mechanisms, the combination with said machine of a second machine unit having a plurality of processing mechanisms including a sensing means, a card feeding means for advancing a second set of cards successively through the plurality of processing mechanisms of the second machine and a drive shaft directly connected to and continuously operating the processing mechanisms in the second machine unit, a coupling for detachably connecting the drive shafts of the two machine units to drive the processing mechanisms of the second machine unit from the first machine unit in mechanically locked synchronism with the processing mechanisms of the first machine unit, said card feeding means in each machine comprising reciprocating rails frictionally engaging the opposite sides of the cards adjacent the edges thereof and extending throughout the length of the plurality of processing mechanisms to simultaneously advance a plurality of successive cards, intercepting mechanism engaging the edges of the cards to hold the cards relative to the reciprocating rails, and means operable responsive to a signal from the sensing means in one machine to control the intercepting mechanism and the feeding of a card by the card feeding means on the other machine to feed corresponding cards in the two machines in synchronism in accordance with information supplied from said one machine.

2. In a record processing system, the combination of, a first machine unit for processing primary cards having information contained thereon, said first machine having a plurality of processing stations, card feeding means for advancing primary cards through the successive stations, sensing means at one of the stations for sensing information contained on the primary cards, driving means for the card feeding means on the first machine and including a shaft with a coupling projecting from the machine, a second machine unit for processing secondary cards, said second machine having a plurality of stations, sensing means at one of the stations for sensing information contained on the secondary card, a card feeding means, driving means for the card feeding means including a shaft having a coupling projecting from the machine, means for driving the shaft on one of said machines, said coupling on said second machine being connected to the coupling on the first machine whereby to operate the card feeding means for the primary and secondary cards in synchronism, means on each machine to control the advance of cards by its card feeding means, and means operable responsive to information sensed on a card in each machine to control the feeding of a card in the other machine whereby to produce synchronous feed of primary and secondary cards in response to information sensed on either or both of the primary and secondary cards.

3. In a record processing system, the combination of, a first machine for primary cards having information contained thereon including indicia printed on one side thereof, said machine having a plurality of stations, card feeding means having reciprocating elements frictionally gripping the edges of the cards for feeding primary cards intermittently through successive stations of the first machine, means at one of the stations for sensing information contained on the primary cards, driving means for the first machine including a drive shaft directly connected to continuously operate the card feeding means, a second machine for secondary cards having a plurality of stations including a printing station, card feeding means on the second machine having reciprocating elements frictionally gripping the edges of the cards for advancing secondary cards successively through the plurality of stations to the printing station, a driven shaft on the second machine directly connected to continuously operate the card feeding means thereon, coupling means for connecting the driving and driven shafts on the first and second machines, said card feeding means of the first and second machines positioning a primary and secondary card one over the other at the printing station, means operable responsive to information sensed on each primary card for controlling the advance of a secondary card by the card feeding means on the second machine, a press comprising a reciprocating element at the printing station on the second machine for pressing the primary and secondary cards into engagement with each other to transfer indicia from the primary card to the secondary card, and driving means operated by the driven shaft to continuously operate the reciprocating element of the press synchronously in timed relation to the reciprocating card feeding means of the two machines to insure exact registry of the cards at the time they are pressed into engagement with each other.

4. In a record processing system the combination of, a first machine having a plurality of stations through which primary cards are advanced having information contained thereon including indicia printed on one side thereof, primary card feeding means, sensing means at one of said stations for sensing information contained on each primary card, a driving shaft connected to operate the card feeding means, a second machine having a plurality of stations through which secondary cards are advanced, card feeding means on the second machine comprising reciprocating elements for frictionally gripping the edges of the cards, a driven shaft on the second machine for driving the card feeding means thereon, detachable couplings for connecting the driving shaft on the first machine to the driven shaft on the second machine, moistening means comprising a reciprocating element at one station of the second machine for wetting secondary cards with a solvent for the ink of the indicia on the primary card, press means comprising a reciprocating element at another station of the second machine, said card feeding means feeding primary and secondary cards from the first and second machine to superimposed relation at the printing station in the second machine, means operable responsive to information sensed on each primary card to control the advance of a corresponding secondary card in the second machine, said moistening means applying moisture to each secondary card at the moistening station and said press means operating the press at the printing station, and driving means operated by the driven shaft of the second machine and directly connected to continuously operate the reciprocating elements of the card feeding means and reciprocating elements of the moistening means and press in alternate timed relation to feed secondary cards to the moistening and printing stations successively and apply moisture and transfer indicia between feeding strokes of the reciprocating card feeding elements.

5. In a record processing system utilizing primary cards having information thereon including indicia printted on one side thereof, the combination of, a first machine for processing said primary cards comprising means for feeding successive cards in one path through the machine, means on said first machine for sensing information on said primary cards, a second machine for reproducing secondary cards having at least part of the information contained on the primary cards, said second machine having a first card feeding means for intermittently feeding secondary cards to successive stations in one path through the machine, means operable responsive to a signal from the sensing means of the first machine for controlling the operation of the card feeding means of the second machine to feed a secondary card, a second feeding means on said second machine for receiving primary cards as they are delivered from the first machine and intermittently feed them across the path of the secondary cards advanced by the first card feeding means, driving means for continuously operating the first and second card feeding means on the second machine in synchronism with the card feeding means of the first machine, means at one station of the second machine comprising a reciprocating element for wetting the secondary card with a solvent for the ink of the indicia printed on the primary cards, said primary and secondary cards overlying each other at a common printing station where the paths intercept, a press comprising a reciprocating element for pressing the primary and secondary cards into engagement with each other at said printing station to transfer the indicia from a primary card onto a secondary card, and said driving means being connected to continuously operate the reciprocating elements of the moistening means and press synchronously with the card feeding means of the two machines.

6. In a record processing system utilizing primary cards having information contained thereon including indicia printed on one side thereof, apparatus for processing said primary cards comprising feeding means for feeding primary cards through successive stations in one path, card feeding means for feeding secondary cards through successive stations in another path intercepting the path of the primary cards, means operable responsive to information sensed on each primary card at one station for controlling operation of the card feeding means to feed a secondary card, means at one station in said second path for moistening secondary cards with a solvent for the ink of the indicia printed on the primary cards, a press at a common printing station in the intercepting paths for the primary and secondary cards, a common driving means for the card feeding means for the primary and secondary cards to advance the cards in synchronism until they overlie each other at the printing station, and means continuously driven by the common driving means for operating the moistening means and press in timed relation with the card feeding means.

7. In a record processing system utilizing primary cards having information contained thereon and including indicia printed on one side thereof, apparatus for processing said primary cards and reproducing secondary cards containing at least a portion of the information on the primary cards comprising card feeding means having an endless belt for feeding primary cards in one path, continuously operating driving means for said card feeding belt, oscillating mechanism cooperating with said belt driving means to convert the continuous drive to an intermittent advance of the primary cards, a reciprocating carriage for feeding secondary cards in another path which crosses the first path, said second path having a moistening station and a printing station where the primary and secondary cards overlie each other in their separate paths, a reciprocating moistener at the moistening station for moistening secondary cards with a solvent for the ink of the indicia on the primary cards, a reciprocating press at the printing station for pressing the primary and secondary cards into contact with each other to transfer indicia from the primary to the secondary cards, a first driven shaft for operating the primary card feeding means and oscillating mechanism, a second driven shaft for operating the secondary card feeding means and the reciprocating means at the moistening and printing stations, and a main drive shaft for driving the first and second mentioned driven shafts in synchronism.

8. In a record processing system in accordance with claim 7 in which the reciprocating means at the moistening and printing stations have relatively movable parts connected for movement through a full stroke, latching means for latching the relatively movable parts of the reciprocating means for movement through a lesser stroke, and control means responsive to the presence of a secondary card at the printing station for controlling the operation of the latch.

9. In a record processing system in accordance with claim 7 in which the reciprocating means at the moistening and printing stations move in opposite directions to simultaneously moisten and print, a shaft having eccentrics for operating the separate reciprocating means, and driven means for operating said eccentric shaft in synchronism with the card feeding means.

10. In a machine for processing primary cards having information thereon and secondary cards onto which at least a portion of the information is transferred from the primary cards, the combination of, means for feeding primary cards in successive steps in one path through the machine, means for feeding secondary cards in another path through the machine which crosses the path for the primary cards, said last named means comprising opposed reciprocating rails for yieldingly gripping the edges of secondary cards therebetween, pivoted detents for holding a card at a predetermined position during the return stroke of the reciprocating rails, a continuously operating prime mover, and means driven by the prime mover for continuously operating the primary and secondary card feeding means in synchronism to cause a primary card and secondary card to overlie each other in exact registry at the location where the paths cross each other.

11. In a record processing system utilizing primary cards having information contained thereon to produce secondary cards having at least part of the information contained on the primary cards, the combination of, a first machine for processing said primary cards having card processing mechanisms at successive stations comprising sensing means at one station, recording means at another station and, means for feeding primary cards successively through the successive stations of the machine, a second machine for reproducing secondary cards having card processing mechanisms at successive stations comprising sensing means at one station, recording means at another station and means for feeding the secondary cards, a common driving means for driving the feeding means of the two machines in synchronism, comprising a drive shaft on the machine for processing primary cards, a driven shaft on the machine for reproducing secondary cards, a detachable coupling connecting the drive and driven shafts to operate the feeding means for the primary and secondary cards, and means operable responsive to the sensing means in each machine for controlling the operation of one or more processing mechanisms in the other machines whereby to transfer information from cards in one machine to cards in the other machine.

12. In a record processing system as defined in claim 11 in which the two machines are arranged at right angles to each other to feed the primary and secondary cards through intercepting paths.

13. In a record processing system in accordance with claim 11 in which means operated in response to information contained on a primary card controls the card feeding means on the second machine for advancing a secondary card.

14. In a record processing system in accordance with claim 11 in which card feeding means on the second machine feeds primary cards across the path of the secondary cards, said last named primary card feeding means receiving primary cards from the first machine and delivering the primary cards back to the first machine.

15. In a record processing system in accordance with claim 10 in which information on the primary cards includes indicia printed on one side thereof, and means for pressing the primary and secondary cards into engagement with each other when they are moved into overlying relationship by their separate feeding means.

16. In a record processing system in accordance with claim 11 in which the second machine for reproducing secondary cards includes means at one of said stations to moisten the secondary card, and means at another station to press superimposed primary and wetted secondary cards into engagement with each other to transfer the indicia from the primary card to the secondary card.

17. In a record processing system in accordance with claim 11 in which the card feeding means of the second machine advances the secondary cards across the path for the primary cards and then returns the secondary cards through a path underlying the path for the primary cards.

18. In a business machine for transferring indicia printed on primary cards to secondary cards, means for intermittently feeding primary cards with a step by step motion in one path through the machine, a reciprocating card feeding means for intermittently feeding secondary cards with a step by step motion in another path through the machine intercepting the path for the primary cards, a reciprocating moistening pad movable toward and away from the path of said secondary cards for engaging each secondary card between successive steps of advance by the card feeding means, and driving means directly connected to the card feeding means and moistening pad to continuously operate the card feeding means and card moistening pad to advance a card during the forward stroke of the feeding means and moisten the card during the return stroke of the feeding means.

19. In a business machine for transferring information from primary cards to secondary cards, means for feeding secondary cards through the machine successively, reciprocating mechanism operated in synchronism with the card feeding means, card engaging means separate from the card feeding means and operated by the reciprocating mechanism for performing an operation in transferring information from primary to secondary cards, said reciprocating mechanism having relatively movable parts, and latching means for selectively connecting or disconnecting the relatively movable parts of the reciprocating mechanism to control engagement of said cards by said means.

20. In a business machine for transferring indicia printed on primary cards onto secondary cards, means for feeding secondary cards through the machine successively, a moistening pad for engaging each secondary card as it is advanced by the card feeding means, a two part reciprocating means for operating the moistening pad, a latch for latching and unlatching the parts of the reciprocating means to operate the moistening pad through a full stroke to engage a card or through a shorter stroke, and means responsive to the location of a secondary card in position to be engaged by the moistening pad to control the latch and operate the moistening pad through a full stroke to wet the card or through a shorter stroke when no card is present.

21. In a record processing system for transferring information from primary cards having indicia printed thereon onto secondary cards, a first machine having card feeding means for advancing primary cards successively therethrough, a second machine having card feeding means for advancing secondary cards therethrough in a path intercepting the path of the primary cards, means on the first machine for sensing information on the primary cards for controlling operation of the card feeding means of the second machine to advance a secondary card, a pad for moistening each secondary card as it is advanced by the card feeding means, reciprocating means for operating the moistening pad through a full stroke to contact a card or through a shorter stroke, and a sensing element on the second machine responsive to the location of a secondary card in position to be engaged by the moistening pad to control the stroke of the reciprocating means.

22. In a card processing system in which indicia printed on a primary card is transferred to a secondary card, moistening mechanism for wetting a secondary card with a solvent for the ink of the indicia printed on a primary card comprising a moistening pad, a slide on which the moistening pad is mounted, a crosshead mounted on the slide for movement relative thereto, a spring between the slide and crosshead for yieldingly holding the slide in extended relation to the crosshead, a crank shaft, a connecting rod between the crankshaft and crosshead, a link pivotally connected to the connecting rod at one side of its pivotal connection to the crosshead and engaging an abutment on the slide, said link actuating the slide to a retracted position relative to the crosshead against the action of the spring by the angular movement of the connecting rod, and a latch on the slide for engaging a notched latch keeper on the crosshead to latch the slide to the crosshead in its retracted position.

23. In a machine for transferring indicia printed on one side of primary cards onto corresponding secondary cards, means for feeding primary cards in one path through the machine, means for feeding secondary cards in another path through the machine, card moistening means for moistening secondary cards with a solvent for the ink of the indicia printed on the primary cards, means for pressing primary and secondary cards into engagement when they overlie each other at a printing station where the separate paths intercept, reciprocating means for operating the card moistening and printing means, respectively, said reciprocating means having relatively movable parts, driving means for reciprocating said parts and moving them relative to each other during said reciprocation, a latch mounted on one of said parts, a notch on the other part, a spring for yieldingly urging the latch into the notch, and means operable responsive to the location of a card in position to be engaged by the moistening or pressing means for controlling the engagement of the latch with the notch.

24. In a machine in accordance with claim 23, in which the control means comprises a pivotally mounted cam element at one end of the latch for controlling the engagement of the latch on one part with the notch on the other part as the parts reciprocate, a Bowden wire for rocking the pivoted cam element, and a pivoted member actuated by a card for controlling the Bowden wire.

25. In a machine for transferring indicia printed on primary cards onto secondary cards, means for feeding primary cards in one path through the machine, means for feeding secondary cards in another path through the machine which intercepts the path of the primary cards, a moistening pad for engaging said secondary cards to moisten them with a solvent for the ink of the indicia printed on the primary cards, means for pressing primary and secondary cards into engagement when they overlie each other in their separate paths, reciprocating mechanism operated in timed relation to the feeding means for actuating the moistening pad and card pressing means, respectively, said reciprocating mechanism having relatively movable parts, a latch on one of the parts of the reciprocating mechanism, a notch on the other part engaged by the latch to prevent relative movement between the parts during reciprocation, and means responsive to the position of a secondary card to control engagement of the latch on one part with the notch on the other part.

26. A machine in accordance with claim 19 having a card moistening pad, an abutment on one of the relatively movable parts of the reciprocating mechanism, a pump on the other relatively movable part of the reciprocating mechanism for engaging the abutment to feed solvent liquid to the pad during each stroke of the reciprocating mechanism, and said latch controlling relative movement between the parts and the supply of solvent liquid to the pad.

27. A machine in accordance with claim 20 in which the control means responsive to the location of a secondary card comprises a pivotally mounted arm adapted to be rocked by the secondary cards as they move into position, a pivoted cam for moving the latch to unlatching position, and a Bowden wire connected between the pivoted arm and cam whereby the movement of a secondary card into position actuates the latch to releasing position.

28. In a record processing machine utilizing primary cards having information thereon including indicia printed on one side thereof and secondary cards onto which at least a portion of the information of the primary card is transferred, means for feeding primary cards in one path through the machine, means for feeding secondary cards in another path through the machine so that the primary and secondary cards overlie each other at one location, a press for pressing the primary and secondary cards into engagement with each other at said location, said press comprising a fixed platen and a movable head, reciprocating mechanism for operating said head toward and away from said platen, said reciprocating mechanism having relatively movable parts, means for connecting said parts for moving said press through a full stroke, and means for latching the relatively movable parts of the reciprocating mechanism in contracted relation for movement through a shorter stroke, and means responsive to the location of a secondary card to control the latching of the relatively movable parts.

29. A machine in accordance with claim 28 in which the control means comprises a pivoted arm in the path of the secondary cards, a cam for actuating the latch and a Bowden wire extending between the arm and cam.

30. In a card processing system in which indicia printed on a primary card is transferred to secondary card, printing mechanism comprising a pivoted bail having a head for pressing superimposed cards against each other, operating mechanism for the pressing head comprising a slide, rods connecting said pivoted bail to said slide, a crosshead mounted on the slide for movement relative thereto, a spring between the slide and crosshead for yieldingly holding the slide in extended relation to the crosshead, a crank shaft, a connecting rod between the crank shaft and crosshead, a link pivotally connected to the connecting rod at one side of its pivotal connection to the crosshead and engaging an abutment on the slide, said link actuating the slide to a retracted position relative to the crosshead against the action of the spring by the angular movement of the connecting rod, and a latch on the slide for engaging a notched latch keeper on the crosshead to latch the slide to the crosshead in its retracted position.

31. In a record processing machine utilizing primary cards having information thereon including indicia printed on one side thereof and secondary cards onto which at least a portion of the information of the primary card is transferred, means for feeding primary cards in one path, reciprocating means for feeding secondary cards with a step by step movement in another path during a forward stroke, said path for said secondary cards having a plurality of stations including a moistening station and a printing station, a reciprocating pad for moistening the secondary card at the moistening station during a return stroke of the feeding means, a reciprocating press for pressing the primary and secondary cards into engagement with each other at the printing station during a return stroke of the feeding means, and driving means directly connected to continuously operate the card feeding means, moistening pad and press in synchronism.

32. In a record processing machine utilizing primary cards having information thereon including indicia printed on one side thereof and secondary cards onto which at least a portion of the information of the primary card is transferred, means for feeding primary cards in one path, means for feeding secondary cards in another path intercepting the path for the primary cards, said path for the secondary cards having a moistening station and a printing station at the location where the primary and secondary cards overlie each other, a pad for moistening the secondary cards at the moistening station, a press for pressing the primary and secondary cards into engagement with each other at the printing station, separate reciprocating means for operating the moistening pad and press, and a single driving means for the separate reciprocating means to simultaneously cause the moistening pad to be raised and the press to be lowered at the separate moistening and printing stations.

33. In a machine for transferring indicia printed on primary cards on secondary cards comprising means for feeding primary cards in one horizontal path through the machine, means for feeding secondary cards in another horizontal path through the machine, said path for the secondary cards comprising a moistening station and a printing station, a reciprocating member at each station mounted for vertical sliding movement, a shaft extending between said elements and having eccentric crank pins engaging bearings in the respective members, and means for rotating said shaft in timed relation to said feeding means to reciprocate said members.

34. In a machine for transferring indicia printed on primary cards to secondary cards comprising means for feeding primary cards in one path through the machine with a step by step movement, means for feeding secondary cards in another path through the machine with a step by step movement, said path for the secondary cards intercepting said path for the primary cards at a printing station, a card moistening station in said path, a reciprocating member at each station, a moistening pad connected to said member at the card moistening station, a press connected to said member at the printing station, a shaft extending between said elements and having eccentric pins at its opposite ends journaled in the respective members, and a single drive shaft connected to drive the card feeding means for the primary and secondary cards and the eccentric shaft in predetermined timed relation to each other.

35. In a card processing machine for transferring indicia printed on primary cards to secondary cards, the combination of, means for intermittently feeding primary cards in one path through the machine with a step by step movement through successive stations, means for intermittently feeding secondary cards in another path through the machine with a step by step movement, said paths intercepting at a printing station where the primary and secondary cards overlie each other, means for pressing the superimposed cards at the printing station to transfer the indicia from the primary to the secondary cards, and means mounting at least one of the card feeding means for movement bodily relative to the printing station to adjust the location on the secondary card where the indicia is transferred.

36. A card processing machine in accordance with claim 35 having a frame with spaced sides and a bed plate extending between the sides, a drive shaft journaled in the side plates of the frame, a box frame slidably mounted on the bed plate, bolts for fastening the box frame at any adjusted position on the bed plate, one of said card feeding means being mounted on the box frame and having a driven shaft journaled on the box frame, pulleys on the drive and driven shafts, a belt connecting the pulleys, and an adjustable idler pulley for tightening the belt in any adjusted position of the box frame on the main frame.

37. In a card processing machine having a plurality of successive stations including a moistening station and a printing station, a main frame, a drive shaft journaled on said main frame, card feeding mechanism mounted on said main frame for feeding primary cards across the main frame to the printing station, a second frame relatively movable along said main frame, card feeding means mounted on the second frame for feeding secondary cards along the main frame to the printing station, driving means on the second frame for operating the secondary card feeding means and including a driven shaft, a flexible driving connection between the drive shaft on the main frame and driven shaft on the second frame, and means for clamping the second frame to the main frame whereby to adapt the location of a secondary card at the printing station to be adjusted throughout its width.

38. A card processing machine in accordance with claim 37 in which a punching mechanism is mounted on the second frame, and the driving means for the secondary card feeding means being connected to operate the punching mechanism.

39. In a record processing system in accordance with claim 1 in which the card feeding means for advancing secondary cards comprises a card release mechanism having arms located in the path of movement of the cards to hold the cards from advancing with the reciprocating rails, and said means operable responsive to a signal from the sensing means is connected to raise the arms out of the path of movement of the cards.

40. In a record processing system in accordance with claim 1 in which the card feeding means for advancing secondary cards comprises a card interrupt mechanism having arms raised above the path of the cards, and said means is connected to lower the arms in the path of the cards to intercept the cards and hold them from advancing with the reciprocating rails.

41. In a record processing machine in accordance with claim 11 in which the second machine has card conveying mechanism for receiving primary cards from and delivering them back to the first machine.

42. In a record processing machine in accordance with claim 41 in which the card conveying mechanism for primary cards moves the cards across the top of the second machine in a path intercepting the path of the secondary cards and then reverses their direction below the top of the machine.

43. In a card processing machine in accordance with claim 40 in which the second machine has a magazine at one end and a card sorter and stacker below the magazine, a card return conveyor cooperating with the means for feeding secondary cards for returning the secondary cards to the sorter and stacker, the card return conveyor for the primary and secondary cards crossing each other, and the card return conveyors being driven in synchronism by the common driving means.

44. In a card processing system, a plurality of individual and separate card processing machines, each machine having a plurality of successive stations, card feeding means for advancing a set of cards through the successive stations, card intercept means engaging the edge of a card to control its movement by the card feeding means, card processing mechanisms including means for sensing information on a card at one station and means for applying information to a card at another station and driving means including a drive shaft for operating the card feeding means and car processing mechanisms in timed relation to each other, means projecting from the separate machines for coupling the drive shafts of the plurality of machines to continuously operate the corresponding card feeding and processing mechanisms of the plurality of machines in synchronism, and means operable responsive to the sensing means in each machine for controlling the operation of one or more processing mechanisms and card intercept means in the other machines whereby to transfer information from cards in each machine to cards in the other machines.

45. A card processing system in accordance with claim 44 in which the means for applying information to a card at one of the stations is a punch.

46. A card processing system in accordance with claim 44 in which the means for applying information at one station in one machine is a transfer printing mechanism.

47. A card processing system in accordance with claim 44 in which the card processing mechanisms in one of the machines comprise a punch at one station, a card moistening mechanism at another station and a transfer printing mechanism at another station.

48. In a record processing system for transferring information to and from cards of different sets, a plurality of machine units each having a plurality of processing mechanisms including a reciprocating sensing means at one station and a reciprocating recording means at another station, a common operating means for simultaneously actuating the sensing means and recording means at successive stations, a reciprocating card feeding means for advancing cards during its forward stroke, detent means for holding the cards during the return stroke of the card feeding means and a drive shaft connected to continuously drive the operating means and card feeding means to advance cards one station during the forward stroke of the card feeding means and reciprocate the sensing and recording means during the return stroke of the card feeding means, interengaging coupling elements on the drive shafts of the plurality of machine units to simultaneously operate the card feeding means and processing mechanisms of the plurality of machine units in synchronism, and means operable responsibe to the sensing mechanism in each machine unit for controlling operation of one or more processing mechanisms in the other machine units whereby to transfer information from cards in each machine unit to cards in other machine units.

49. In a record processing system utilizing primary cards having information thereon including indicia printed on one side thereof, a machine for processing said primary cards and producing secondary cards in accordance with information sensed from the primary cards comprising a plurality of successive stations longitudinally of the machine including a printing station, a magazine for secondary cards at one end of the machine, card feeding means for secondary cards including a reciprocating carriage and card advancing means extending along one path through successive stations, operating mechanism at each station at one side of the card advancing means and mounted to reciprocate in a direction toward and away from cards at each station, said mechanism including a press at the printing station, card feeding means for intermittently advancing primary cards in another path transversely of the machine which intercepts the path of the secondary cards at the printing station, a common driving means directly connected to continuously operate the feeding means for primary and secondary cards and the operating mechanisms at the plurality of stations, said driving means reciprocating the card feeding means and plurality of operating means in interlocked synchronism to advance secondary cards from one station to the next during the forward stroke of the feeding means and reciprocate the operating mechanisms at each station including the press at the printing station toward the cards during the return stroke of the card feeding means, the operating means at a station adjacent the printing station wetting the secondary cards with a solvent for the indicia on the primary cards for transferring the indicia from the primary card to the secondary card overlying each other at the printing station.

50. A record processing system in accordance with claim 49 in which the reciprocating operating mechanism for wetting the cards at the station adjacent the printing station comprising a pad wetted with the solvent for the printed indicia on the primary card for engaging the side of the card.

51. In a record processing system utilizing primary cards having information thereon including indicia printed on one side thereof, a machine for processing said primary cards and producing secondary cards in accordance with information sensed from said primary cards comprising a plurality of stations longitudinally of the machine including a printing station, a reciprocating card feeding means for feeding successive secondary cards in one path through successive stations longitudinally of the machine, card feeding means for feeding primary cards transversely of the machine in a second path crossing the first path for secondary cards at the printing station, said primary card feeding means comprising spaced sprockets at each side of the printing station and a driving sprocket at one side of the spaced sprockets, a continuous toothed belt around the sprockets and having card engaging means at one side thereof, an oscillating arm having spaced belt engaging elements at opposite sides of the driving pulley, a cam for continuously oscillating the arm to alternately take-up and pay-out slack in the continuous belt at opposite sides of the driving sprocket to start and stop motion of the card feeding belt between belt engaging elements on the oscillating arm, and driving means directly connected to continuously rotate the driving sprocket for the belt for feeding primary cards and reciprocate the card feeding means for secondary cards in locked synchronism to position primary and secondary cards one over the other at the printing station.

52. In a record processing system in accordance with claim 51 in which said primary card feeding means comprises a pair of spaced sprockets at each side of the printing station, a pair of driving sprockets, spaced continuous toothed belts extending around one of the sprockets of each pair, respectively, and opposed pairs of belt engaging elements on the oscillating arm at opposite sides of the driving pulley whereby a primary card extends between the spaced belts with the indicia thereon overlying the secondary card between the belts.

References Cited in the file of this patent

UNITED STATES PATENTS

| | | |
|---|---|---|
| 1,354,918 | Runyan | Oct. 5, 1920 |
| 1,489,167 | Spieso | Apr. 1, 1924 |
| 1,564,221 | Duncan | Dec. 8, 1925 |
| 2,406,040 | Ryan et al. | Aug. 20, 1946 |
| 2,419,345 | Elliott | Apr. 22, 1947 |
| 2,503,185 | Wright | Apr. 4, 1950 |
| 2,551,080 | Allen et al. | May 1, 1951 |
| 2,568,064 | Gollwitzer | Sept. 18, 1951 |
| 2,765,733 | Gollwitzer | Oct. 9, 1956 |
| 2,766,685 | Sauerman | Oct. 16, 1956 |
| 2,771,838 | Federwitz | Nov. 27, 1956 |